US006807165B2

(12) United States Patent
Belcea

(10) Patent No.: US 6,807,165 B2
(45) Date of Patent: Oct. 19, 2004

(54) TIME DIVISION PROTOCOL FOR AN AD-HOC, PEER-TO-PEER RADIO NETWORK HAVING COORDINATING CHANNEL ACCESS TO SHARED PARALLEL DATA CHANNELS WITH SEPARATE RESERVATION CHANNEL

(75) Inventor: John M. Belcea, W. Melbourne, FL (US)

(73) Assignee: MeshNetworks, Inc., Maitland, FL (US)

( * ) Notice: Subject to any disclaimer, the term of this patent is extended or adjusted under 35 U.S.C. 154(b) by 0 days.

(21) Appl. No.: 09/815,157

(22) Filed: Mar. 22, 2001

(65) Prior Publication Data

US 2002/0080750 A1 Jun. 27, 2002

Related U.S. Application Data

(60) Provisional application No. 60/246,833, filed on Nov. 8, 2000.

(51) Int. Cl.[7] .............................................. H04B 7/212
(52) U.S. Cl. ....................... 370/347; 370/316; 370/318; 370/442
(58) Field of Search ................................. 370/315, 316, 370/319, 321, 337, 329, 330, 333, 400, 401, 442, 318, 322, 326, 336, 341, 347, 436, 437; 455/435, 452, 11.1, 13.1, 13.4, 16

(56) References Cited

U.S. PATENT DOCUMENTS

| | | | |
|---|---|---|---|
| 4,494,192 A | 1/1985 | Lew et al. | 364/200 |
| 4,617,656 A | 10/1986 | Kobayashi et al. | 370/74 |

(List continued on next page.)

FOREIGN PATENT DOCUMENTS

| | | |
|---|---|---|
| CA | 2132180 | 3/1996 |

(List continued on next page.)

OTHER PUBLICATIONS

"Toplogy Control of Multihop Wireless Networks using Transmit Power Adjustment", by Ram Ramanathan and Regina Rosales–Hain; BBN Technologies (Division of GTE), Cambridge, Mass. 1997.

(List continued on next page.)

*Primary Examiner*—Phirin Sam
(74) *Attorney, Agent, or Firm*—Gardner Carton & Douglas LLP; Joseph J. Buczynski

(57) ABSTRACT

A novel protocol for an ad-hoc, peer-to-peer radio network that provides collision-free channel access with an emphasis on improving geographic reuse of the frequency spectrum. The protocol of the invention is executed on the reservation or control channel, and provides a method for allocating data transactions on the data channels. The system of the invention utilizes multiple parallel data channels that are coordinated by a single reservation channel. The transceiver of the system employs two modems to solve the channel reliability issues with multiple channel designs, where one is dedicated as a receive-only modem for gathering channel usage information on the reservation channel. High quality voice, video and data may be transmitted. The reservation channel implements a time division multiple access algorithm with dynamic slot allocation. In a distributed manner, nodes determine geographic reuse of slots based on channel quality extracted from the modem. Signal quality calculations are used to determine the likelihood of a slot reuse causing destructive interference within a node's neighborhood. Requests for slot usage are compared with the known traffic pattern and accepted or rejected by nodes within RF signal range based on the signal quality calculations.

56 Claims, 6 Drawing Sheets

U.S. PATENT DOCUMENTS

| | | | |
|---|---|---|---|
| 4,736,371 A | 4/1988 | Tejima et al. | 370/95 |
| 4,742,357 A | 5/1988 | Rackley | 342/457 |
| 4,747,130 A | 5/1988 | Ho | 379/269 |
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,722 A | 3/1996 | Fulghum | 370/69.1 |
| 5,517,491 A | 5/1996 | Nanni et al. | 370/29 |
| 5,533,026 A | 7/1996 | Ahmadi et al. | 370/94 |
| 5,555,425 A | 9/1996 | Zeller et al. | 395/800 |
| 5,555,540 A | 9/1996 | Radke | 370/16.1 |
| 5,572,528 A | 11/1996 | Shuen | 370/85.13 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A * | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,748,624 A | 5/1998 | Kondo | 370/347 |
| 5,774,461 A * | 6/1998 | Hyden et al. | 370/329 |
| 5,774,876 A | 6/1998 | Woolley et al. | 705/28 |
| 5,781,540 A | 7/1998 | Malcolm et al. | 370/321 |
| 5,787,076 A | 7/1998 | Anderson et al. | 370/294 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,016,311 A | 1/2000 | Gilbert et al. | 370/280 |
| 6,028,853 A | 2/2000 | Haartsen | 370/338 |
| 6,029,074 A | 2/2000 | Irvin | 455/571 |
| 6,029,217 A | 2/2000 | Arimilli et al. | 710/107 |
| 6,034,542 A | 3/2000 | Ridgeway | 326/39 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,058,106 A | 5/2000 | Cudak et al. | 370/313 |
| 6,064,626 A | 5/2000 | Stevens | 365/233 |
| 6,067,291 A | 5/2000 | Kamerman et al. | 370/338 |
| 6,067,297 A | 5/2000 | Beach | 370/389 |
| 6,078,566 A | 6/2000 | Kikinis | 370/286 |
| 6,088,337 A | 7/2000 | Eastmond et al. | 370/280 |
| 6,097,704 A | 8/2000 | Jackson et al. | 370/280 |
| 6,104,712 A | 8/2000 | Robert et al. | 370/389 |
| 6,108,316 A | 8/2000 | Agrawal et al. | 370/311 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,198,784 B1 * | 3/2001 | Archambaud et al. | 375/371 |
| 6,208,870 B1 | 3/2001 | Lorello et al. | 455/466 |
| 6,222,463 B1 | 4/2001 | Rai | 340/928 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,263,210 B1 * | 7/2001 | Takahashi | 455/464 |
| 6,275,707 B1 * | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 * | 12/2001 | Souissi et al. | 375/219 |
| 6,349,091 B1 | 2/2002 | Li | 370/238 |
| 6,349,210 B1 | 2/2002 | Li | 455/450 |
| 6,359,872 B1 | 3/2002 | Mahany et al. | 370/338 |
| 6,434,158 B1 * | 8/2002 | Harris et al. | 370/401 |
| 6,590,928 B1 * | 7/2003 | Haartsen | 375/134 |
| 6,594,273 B1 * | 7/2003 | McGibney | 370/442 |
| 2001/0053699 A1 | 12/2001 | McCrady et al. | 455/513 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

"Reversing the Collision–Avoidance Handshake in Wireless Networks" by J.J. Garcia–Luna–Aceves and Asimmakis Tzamaloukas; Baskin School of Engineering, University of California, Santa Cruz, 1997.

"Self–Organizing, Self–Healing Wireless Networks", by Chip Elliot and Bob Helle; BBN Technologies, Cambridge, Mass; IEEE, 2000.

"A Performance Comparison of Multi–Hop Wireless Ad Hoc Netwrk Routing Protocols", by Josh Broch, et al., Carnegie Mellon University, Pttsburgh, Pa., Proceedings of the Fourth Annual ACM/IEEE International Conference on Mobile Computing and Networking; 1998.

"USAP:A Unifying Dynamic Distributed Multichannel TDMA Slot Assignment Protocol", by C. David Young, Rockwell International, Richardson, Texas.

"Net Throughput with IEEE 802.11 Wireless LANs", by Ad Kamerman and Guido Aben, Lucent Tech., Nieuwegein,The Netherlands.

"Transmission–Efficient Routing in Wireless Networks Using Link–State Information", by J.J. Garcia–Luna–Aceves, Baskin School of Engineering, University of California, Santa Cruz; 1997.

"The Core–Assisted Mesh Protocol", by J.J. Garcia–Luna–Aceves and Ewerton L. Madruga, Baskin School of Engineering, University of California, Santa Cruz; 1997.

"Optimization of an Adaptive Link Control Protocol for Multimedia Packet Radio Networks", by J.R.McChesney, et al.; ITT Industries Aerospace Comm. Div.; Ft.Wayne,IN ; 1997.

"Hierarchically–Organized, Multihop Mobile Wireless Networks for Quality–of–Service Support", by Ram Ramanathan and Martha Steenstrup; BBN Systems and Tech., Cambridge, Mass. 1995.

"Dynamic Multipoint Virtual Circuits for Multimedia Traffic in Multihop Mobile Wireless Networks", by Martha E. Steenstrup; BBN Tech., Cambridge, Mass. 1995.

"Collision–Avoidance Transmission Scheduling for Ad–Hoc Networks", by Zhenyu Tang and J.J. Garcia–Luna–Aceves, University of California Santa Cruz, Calif., 1997.

"QoS Networking with Adaptive Link Control and Tactical Multi–Channel Software Radios", by George Vardakas, et al., Communications Systems Div. of Raytheon Systems Co., San Diego, Calif.; 1997.

"A Review of Current Routing Protocols for Ad–Hoc Mobile Wireless Networks", Royer. et al., Univ. of Calif.

"The Dynamic Source Routing Protocol for Mobile Ad Hoc Networks", IETF MANET Working Group;Josh Broch, et al., Dec. 1998.

"Ad hoc On–Demand Distance Vector Routing draft–ietf–manet–aodv–08.txt", Mobile Ad Hoc Networking Working Group, Charles E. Perkins, et al., Mar. 2, 2001.

"Optimized Link State Routing Protocol", IETF MANET Working Group , Philippe Jacquet, et al, Sep. 2, 2001.

"The Dynamic Source Routing for Mobile Ad Hoc Networks", IETF MANET Working Group. David B. Johnson, et al., Mar. 2, 2001.

Wong et al., "Soft Handoffs in CDMA Mobile Systems", Dec. 1997, IEEE Personal Communications.

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28–Mar. 3, 1999, $2^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

* cited by examiner

TIME DIVISION PROTOCOL FOR AN AD-HOC, PEER-TO-PEER RADIO NETWORK HAVING COORDINATING CHANNEL ACCESS TO SHARED PARALLEL DATA CHANNELS WITH SEPARATE RESERVATION CHANNEL

CROSS-REFERENCE TO RELATED APPLICATIONS

Priority of provision application Ser. No. 60/246,833, filed on Nov. 8, 2000 is herewith claimed.

BACKGROUND OF THE INVENTION

The present invention is directed to a novel protocol for an ad-hoc, peer-to-peer radio network system having coordinating channel access to shared parallel data channels via a separate reservation channel. This system is disclosed in copending application Ser. No. 09/705,588, filed on Nov. 3, 2001, entitled "Methods and Apparatus for Coordinating Channel Access to Shared Parallel Data Channels", which application is incorporated by reference herein in its entirety.

The network system having coordinating channel access to shared parallel data channels via a separate reservation channel of copending application Ser. No. 09/705,588 is directed to a network system, such as radio network, where each node, or radio terminal, of the network is capable of serving as a node or hop of a routing path of a call from another, or to another radio terminal. In that system, communication between nodes or radio terminals is achieved using Carrier Sense Multiple Access with Collision Avoidance (CSMA/CA) protocol with the addition of multiple parallel data channels serviced by one reservation channel. By dedicating a separate reservation channel for the multiple parallel data channels, collision-free access by all of the competing nodes or terminals of the service group of the network is greatly reduced. Communications between terminals or nodes is set up by information exchanged on the separate reservation channel, which information includes all of the call set-up information such as data channel desired to be used for transferring voice, video or data, the desired power level of at least initial transmission, messaging such as Request-to-Send (RTS), Clear-to-Send (CTS), Not-Clear-to-Send (NCTS), Acknowledgment (ACK) for indicating reception of the transmitted call, Non-Acknowledgment (NACK) for indicating improper reception of the call, etc. In this system, in order to further ensure fast, adequate and collision-free transmission and reception, besides a primary modem typically provided with the transceiver of each node or terminal, a secondary modem is also provided which is dedicated to reception on to the reservation channel when the primary modem of the transceiver is occupied, such as when sending out data on a data channel. This system also provides for collision free transmission and reception between nodes or terminals by accessing the reservation and data channels in time slots of time frames, with the information as to which time slot is to be used being included in the messaging transmitted by the reservation channel. Such a format not only provides collision-free transmission, but also allows for Quality-of-Service (QoS) for different types of Class-of-Service (CoS), Thus, not only may voice and video be transmitted, besides data, but voice and data transmission may be prioritized, so that when competing calls vie for a data channel, the delay-dependent voice or video transmissions will take precedence. This prioritization is accomplished by assigning prioritized calls for transmission in earlier time slots of a time frame.

The network system disclosed in U.S. application Ser. No. 09/705,588 ensures that every node or terminal of a service set of terminals has the most information regarding all of other terminals of that service set, so that the choice of data channel to be used, any required delay is transmitting the call, information on power level, and the like, are checked and updated by each terminal by a practically continuous monitoring of the reservation channel.

As explained above, the system disclosed in U.S. application Ser. No. 09/705,588 utilizes protocol that provides collision-free channel access, which also emphasizes improving geographic reuse of the frequency spectrum.

In U.S. Pat. No. 5,943,322—Mayer, et al., which patent is incorporated by reference herein, the radio system thereof is for use in battlefield conditions. The ad-hoc, peer-to-peer radio system of this patent does not have, nor require, a base station, as conventional cellular systems, personal communications system (PCC), and the like, require; instead, each radio terminal forming part of the ad-hoc, peer-to-peer radio system may alternatively serve as a base station, in addition to being an ordinary link terminal of the radio system, whereby, if one such terminal serving as a base station should for some reason become inoperative, another terminal may take over and serve as the base station. In this patent, personal voice communications is based on a time division duplex (TDD) technique in a code division multiple access (CDMA) system, is operated without a fixed base station, and is provided with simultaneous transmission of a communications channel and a control channel, each spread by different PN codes. The PN code facilitates restricting communications on the network to a particular voice-conversation mode and between identified radios. Transmissions are performed in a time division duplex manner in 62.5 milliseconds slots. One of the radios initiates transmission and maintains power control and time synchronization normally done by a base station. A network control station can voluntarily or by command transfer control of the network to any of the other radios on the network. Colliding transmissions from more than one radio require the radios to retry transmitting until one of the radios transmits in an earlier time slot. Conversational mode capability is provided by equipping the radio receivers with despreaders in parallel for permitting a receiving radio to separately despread the simultaneously transmitted signals all other radios on the network and responding to each radio transmission individually. Simultaneous voice and data communications can be accomplished by equipping the receivers with despreaders for discriminating voice and data information signals spread by different PN codes.

In commonly-owned provisional application serial No. 60/248,182, which application is incorporated by reference herein, there is disclosed an ad-hoc, peer-to-peer radio system for use as a stand-alone system that is also connected to a cellular network and/or PSTN. The ad-hoc mobile radio networking system thereof is capable of receiving and transmitting voice, data and video calls through any number of different types of telecommunication networks, such as the PSTN, the Internet, and the like, besides the cellular and next-generation cellular networks.

Past research has shown that conventional Carrier Sense Multiple Access (CSMA) algorithms experience diminishing returns when networks approach their ultimate capacity. The vast majority of current research centers on channel access algorithms that provide transmission capacity over a single shared medium. An example of this is the IEEE 802.11 wireless standard which employs a Carrier Sense Multiple Access/Collision Avoidance (CSMA/CA) algorithm. All users within a Basic Service Set (BSS) share a common channel resource.

The ad-hoc, peer-to-peer radio system of the present invention is based on a transport-mechanism using a time division duplex (TDD) technique in a code division multiple access (CDMA) system. Time Division Duplex (TDD) is a way of maximizing the bits/hz/km2. Such a system not only may be used for providing commercial voice, but is also quite suited to both transmission and reception of data and video services. Time Division Duplex (TDD) systems are typically used for packet data systems, since they make much more efficient use of the available bandwidth, in order to deliver a much higher effective data rate to the end user. TDD is typically used in fixed wired solutions or point-to-point wireless systems because it has its own spectrum limitations. TDD systems, however, have not hitherto been deployed for voice systems.

Unlike the personal communication radio system of U.S. Pat. No. 5,943,322—Mayer, et al., the Time-Division Protocol (TDP) of the present invention does not care about the modem-type of access to radio spectrum, and is designed to work with or without a base station or gateway, since modem functionality is not part of the TDP of the present invention. The protocol of the present invention uses one control/configuration channel and three or more data channels, where communication between radio terminals is planned for preventing interference. Time synchronization is independent of the communication,, whereby no collisions among terminals are possible for configuration data, excepting in the last time slot, and no collisions are possible in the data channels, as described above. The protocol of the present invention may transmit data and video, in addition to voice, since each is just another class of data.

The system of the present invention is much more complex due to multiple, parallel data channels that are coordinated by a single reservation channel. In this system, a combination of CSMA/CA, TDMA (time division multiple access), FDMA (frequency division multiple access), and CDMA (code division multiple access) is used within the channel access algorithm. The transceiver used in the system employs two modems to solve the channel reliability issues with multiple channel designs, as disclosed in the above-described copending U.S. application Ser. No. 09/705,588. Specifically, the system dedicates a receive-only modem for gathering channel usage information on the reservation channel. The reservation channel operates a hybrid CSMA/CA and TDMA algorithm. The remainder of the protocol uses FDMA for the multiple data channels, and CDMA for multiple users on the same data channel.

Reference is also had to copending, commonly-owned U.S. patent application Ser. No. 09/815,164, filed on Mar. 22, 2001, entitled "Prioritized-Routing for an Ad-Hoc, Peer-to-Peer, Mobile Radio Access System", which is incorporated by reference herein, in which there is disclosed an example of routing table messaging which may be used in the present invention.

SUMMARY OF THE INVENTION

It is the primary objective of the present invention to provide an ad-hoc radio system as part of an overall, larger network, and/or as a stand-alone, independent system, in order to provide commercial use for providing voice, data and video communications between radio terminals of the radio system of the invention and between equipment outside the system of the invention.

It is also a primary objective of the present invention to provide an overall protocol for ad-hoc radio system not utilizing a fixed base station, whereby a connection path by which a call is made takes into consideration the power loss associated therewith, in order to determine the least-energy routing of a call for the particular service type being transmitted, such as voice, data or video.

The protocol of the present invention is based on a time-division duplex (TDD) plus code-division multiple access (CDMA) burst packet technology used within the channel access algorithm of the system of the present invention. This provides the improvements in throughput and reliability that are required to deliver high quality voice, video and data. The reservation channel implements a time division multiple access algorithm with dynamic slot allocation. In a distributed manner, nodes determine geographic reuse of slots based on channel quality. Signal quality calculations are used to determine the likelihood of a slot reuse causing destructive interference within a node's neighborhood. Requests for slot usage are compared with the known traffic pattern and accepted or rejected by nodes within RF signal range based on the signal quality calculations. Additionally, the algorithm of the present invention readily provides for the mobility of nodes between geographic areas through the use of a special slot that is reserved for nodes without reservations. Nomadic nodes use this slot to locate a permanent slot to claim for their use. Once claimed, the collision free properties can be enforced to improve the reliability and throughput of messages generated by this node. This results in a maximal use of the spectrum within a geographic area.

The system of the present invention utilizes a method and algorithm which, in the preferred embodiment, is intended for an ad-hoc network system called "ArachNet", and is based on least-energy routing of calls from and between network radio terminals. In simple terms, the major component of the routing decision is to choose the route to the destination that uses the least amount of energy over the complete route. The major reason for this is that least-energy routing minimizes the radiated RF energy, in order to reduce interference between terminals. A consequence of this is that it creates the most efficient use of the power supply of the terminals. Routing tables based on this least energy routing are developed by the system of the invention, and stored at one or more radio terminals, which routing tables are transmitted and stored by other terminals forming part of the link by which a call is connected. An example of such a routing table is disclosed in copending, commonly-owned U.S. patent application Ser. No. 09/815,164, filed on Mar. 22, 2001, entitled "Prioritized-Routing for an Ad-Hoc, Peer-to-Peer, Mobile Radio Access System", which is incorporated by reference herein.

Variants or equivalents of the system of the invention are possible. There are a number of variants of this approach that would provide acceptable performance. These variants include tuning of each of the four access schemes—CSMA/CA, TDMA, FDMA, and CDMA. For example, the width of the time slots may be adjusted based on the specific network over which the protocol is executing. Performance of the network is very dependent on the number of parallel data channels which can be used. A balance exists between the capacity of the reservation channel to make data reservations and the capacity of the data channels to provide service. This balance is dependent on the underlying capabilities of the dedicated, reservations-channel modem that implements the protocol. The performance of the protocol is also dependent on the inclusion of the channel quality extracted from the channel. Accurate estimates of the signal strength translate into improvements in geographic reuse, which can be obtained by aggressive power control schemes. Another example is the use of advancements in the codes used within the CDMA portion. Codes which improve the cross-correlation performance of terminals which share a common data channel improve the throughput and reliability of the overall network performance.

The adaptive power algorithm of the present invention leads to improvements in the determination of RF radius for a given data rate. Increasing the data rate and reducing power promotes geographic reuse. Any loss in communication is easily compensated by our ad-hoc routing algorithms.

The channel access approach of the invention is equally applicable for subnets which include or do not include gateways. In the gateway approach, time is coordinated within the ad hoc environment by the gateway. In the non-gateway approach, a distributed time algorithm provides acceptable performance. In general, gateways permit the creation of larger networks such as MAN's and WAN's.

While the protocol method of the present invention is disclosed with regard to an ad-hoc, peer-to-peer radio system, the protocol is equally applicable to any wireless LAN, wireline network, and the like, to which the method and system disclosed in copending U.S. application Ser. No. 09/705,588 may apply.

BRIEF DESCRIPTION OF THE INVENTION

The present invention will be more readily understood with reference to the accompanying drawings, wherein.

DETAILED DESCRIPTION OF THE INVENTION

Figure 1:
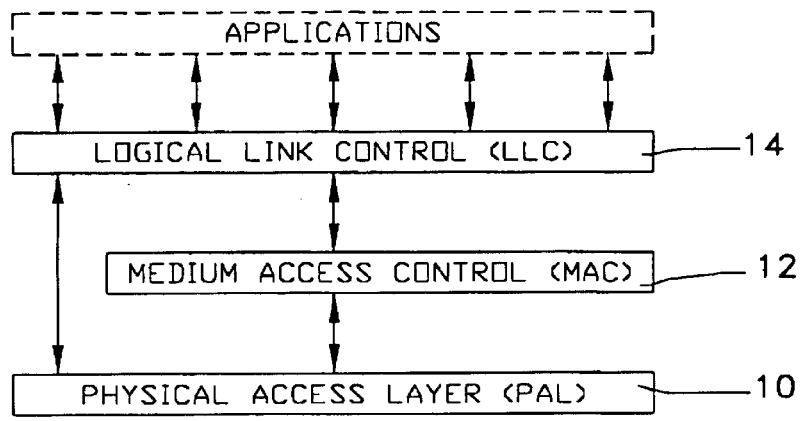
FIG. 1 is a logical flow chart showing the software structure of the protocol of the system of the present invention.

For purposes of a better understanding of the description, the following definitions and abbreviations are hereby given:

DEFINITIONS

"Service Area of a Terminal"
  The geographical area where the transmission of a terminal can be received at a level higher than environment noise.
"Receive Set of a Terminal"
  The set of terminals located within the service area.
"Transmit Set of a Terminal"
  The set of terminals containing one particular terminal within their service areas.
"Service Set of a Terminal"
  The set of terminals that can receive the transmission of one particular terminal and can be received at that terminal (the intersection between the receive set and the transmit set).
"Simple Connection"
  An abstract notion associated to two terminals that can communicate one with another.
"Connecting Path"
  A set of adjacent Simple Connections.
"Service Group of a Terminal"
  The largest set of terminals containing at least one Connecting Path between the host terminal and any other terminal of the set.
"Set of Active Time Slots"
  All time slots used by the service set of a terminal.
"Source Terminal"
  The terminal requesting the service.
"Destination Terminal"
  The terminal requested to provide the service.
"Route"
  The Connecting Path between the Source and the Destination of a service (voice, Internet access or data transfer).
"Link"
  The Route, the Service and the transmitting plan at each hop along the route.
"Isolated Network"
  A network of terminals not connected to a gateway.

ABBREVIATIONS

AD Application Data
  Data required or generated by an application using AT for data transfer. Examples of such applications are: Internet browser, telephone, file transfer server/client, Internet games, e-mail send/receive, short message services, Internet radio/TV broadcaster/receiver, emergency video/audio/text message broadcaster/receiver, report of appliance (including automotive) functionality status, teleconferencing video/audio participant, etc.

AP Arachnet Protocol

The protocol supporting the connection and data transfer between AT's.

AT Arachnet Terminal

The wireless terminal of the system of the present invention.

ATS Active Time Slot Set

The set of time slots that are used by an AT or its service set.

CD Configuration Data

Data exchanged in Configuration Channel for maintaining the connectivity between AT's.

CC Configuration Channel

The radio channel selected for exchanging Configuration Data (channel F0).

DC Data Channel

Radio channels used for exchanging Application data (channels F1, F2 and F3).

GW Gateway

The special type of fixed AT that provides connection to "the World" through "land" (not wireless) connections.

IFTG Inter Frame Time Gap

The time gap between the end of the last TS of a TF and the beginning of the next TF.

IN Isolated Network

The network not connected to the world. An IN has a root AT that provides the functionality needed for data routing and connectivity.

LLC Logical Link Control

The higher level of the protocol stack providing the interface between the network and applications.

MAC Medium Access Control

The medium level of the protocol stack providing the control of the access to the radio spectrum.

PAL Physical Access Layer

The lower level of the protocol stack responsible for transmitting and receiving data to/from other AT's.

RxS Receive Set

The set of terminals that can receive the signal transmitted by the AT owning the set.

SA Service Area

The area where the signal transmitted by an AT can be received at a level higher than environment noise.

SG Service Group of an AT

The group of AT's that can be connected to the host AT with at least one connecting path.

SS Service Set

The set of AT's that can receive the transmission from the host AT and can be received at the host AT.

TF Time Frame

A division of the time. The size of TF if configurable and depends on several environmental factors.

TS Time Slot

A division of the TF. The size and number of TS within a TF is configurable.

TxS Transmit Set of an AT

The set of AT's that can be received by the host AT.

The protocol (AP) of the system of the present invention applies to an ad-hoc, peer-to-peer radio network system having coordinating channel access to shared parallel data channels via a separate reservation channel, as disclosed in copending U.S. application Ser. No. 09/705,588. In the radio network system of the invention, there is no fixed base station; each radio terminal is capable of acting as a mobile relay. The protocol of the present invention provides such an ad-hoc, peer-to-peer radio system with the capability of preventing collisions of data transfer. In high-density populated area (conference halls, stadium, downtown of big cities, etc.), the protocol of the present invention allows each terminal to perform close to its maximum theoretical capacity, while dropping the requests in excess. Such behavior is in contrast with conventional polling-type protocols that cannot provide any service when the number of requested connections is larger than a particular fraction of terminal capacity.

For implementing the protocol of the present invention, each terminal (AT) has full information about all activities of other terminals and will provide all other terminals with full information about its own activity. According to the present invention, a combination of TDMA (time division multiple access), FDMA (frequency division multiple access), and CDMA (code division multiple access) is used within the channel access algorithm of the system of the present invention. This provides the improvements in throughput and reliability that are required to deliver high quality voice, video or data. The reservation channel implements a time division multiple access (TDMA) algorithm with dynamic slot allocation. In a distributed manner, nodes determine geographic reuse of slots based on channel quality extracted from messaging in a separate reservation channel. Signal quality calculations are used to determine the likelihood of a slot reuse causing destructive interference within a node's neighborhood. Requests for slot usage are compared with the known traffic patterns, and accepted or rejected by nodes within RF signal range based on the signal quality calculations. Additionally, the algorithm of the present invention readily provides for the mobility of nodes between geographic areas through the use of a special slot that is reserved for nodes without reservations. Nomadic nodes use this slot to locate a permanent slot to claim for their use. Once claimed, the collision free properties can be enforced to improve the reliability and throughput of messages generated by this node. This results in a maximal use of the spectrum within a geographic area.

The system of the present invention utilizes a method and algorithm for ad-hoc network system that is based on least-energy routing of calls from and between network radio terminals. In simple terms, the major component of the routing decision is to choose the route to the destination that uses the least amount of energy over the complete route. The major reason for this is that least-energy routing minimizes the radiated RF energy, in order to reduce interference between terminals. A consequence of this is that it creates the most efficient use of the power supply of the terminals.

In a medium dynamically changing its structure, superlative notions as "full connectivity", "optimal configuration" or "best structure" are, in fact, not applicable, because they cannot be exactly defined. The protocol of the invention makes full use of all available information (that may be incomplete or approximate) about other terminal activities and broadcasts full information about its own current or intended activity. Such cooperative attitude creates the capability to plan and check data-transfer planning before data transfer is initiated.

In most of the cases, the application data are exchanged between terminals using the same or less transmitting power than the power used for exchanging configuration data on the control or configuration channel. This fact allows better use and reuse of frequencies and time allocation, and makes the application data exchange less sensitive to interference from hidden terminals (AT's).

For supporting the protocol of the present invention each AT of the radio system has the following capabilities:

Measures the level of received signal with very good precision;

Measures the level of received radio noise with very good precision;

Controls the transmit power;

Changes fast from receiving to transmitting;

Changes fast the transmitting or receiving frequency;

Uses a dedicated receiver for listening to Configuration Channel messages;

Controls the data rate; and

Uses a mean for network clock synchronization.

Software Architecture

Referring now to FIG. 1, the protocol of the invention is implemented as a three-layer software stack. The lowest, the Physical Access Layer (PAL) 10, is responsible for transmitting and receiving configuration and application data. It exchanges configuration data with the Middle Access layer (MAC) 12 and application data with the highest layer, the Logical Link Control (LLC) 14. Data is received and transmitted according with the communication plans elaborated at MAC. The Medium Access Control (MAC) is responsible for processing received configuration data, for controlling the transmit power, data rate, for creating the data transmit plans and for building the configuration data to be transmitted to the Service Set (SS) of AT terminals. It exchanges routing data with the LLC and configuration data (power, data rate, transmit plans) with the Physical Access Layer. The protocol of the present invention is carried out in this MAC layer. As will explained hereinbelow, when there exists an isolated network (IN) of terminals, the protocol of the invention is capable of being carried out by each respective AT. Control (LLC) layer is responsible for exchanging application data between applications and the Physical Access Layer (PAL). Data received from PAL is unpacked, decrypted and distributed to applications. Data from application is encrypted, packed (adding routing information), and passed to the PAL to be transmitted.

The exchange of configuration data (CD) between AT's participating in a network of the present invention is accomplished in configuration channel using frequency F0. The other channels (F1, F2, F3) are used for transferring application data (AD) between AT's, thus constituting FDMA scheme of the multiple aspect protocol of the invention.

Figure 2:
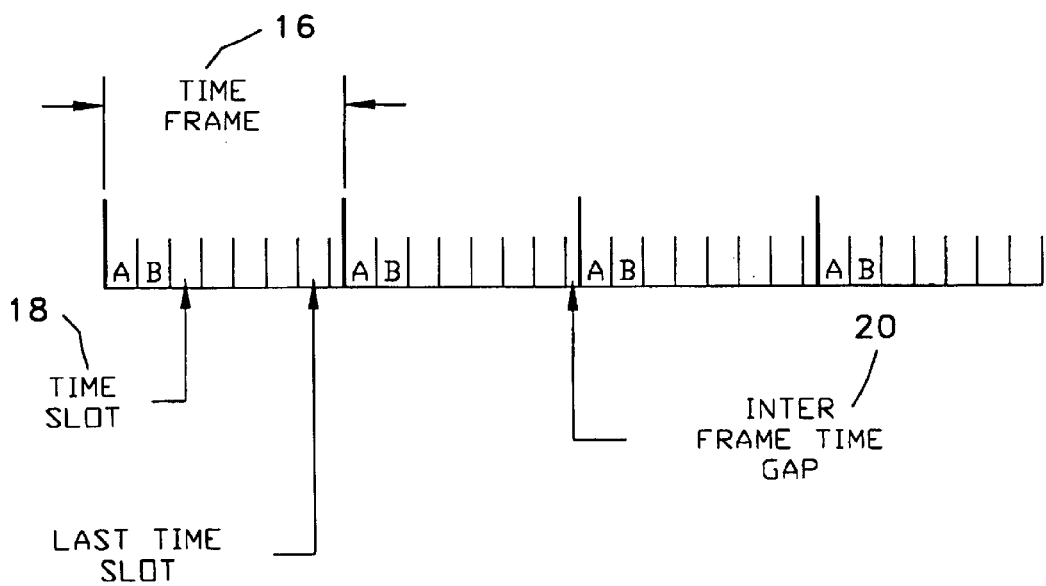
FIG. 2 is depiction of the time-division of the TDD protocol (AP) of the present invention showing the time frames thereof with separated time slots.

The Protocol of the present invention uses a time division scheme (TDD) for organizing the access to airwaves. Referring to FIG. 2, the time is divided in time frames (TF) 16, and each frame is divided in time slots (TS) 18. At the end of each time frame is the Inter Frame Time Gap (IFTG) 20 that has a different length than the regular TS. During the IFTG, no data is sent out by any AT, so that each AT processes data collected from other AT's during the time frame, and will perform required calculations, such as power level, data channel connectivity, etc.

A terminal (AT) can transmit configuration data in CC of frequency F0 only during its own assigned Time Slot (TS). Initially, an AT signals its presence using the last TS of the time frame. With the next time frame, it must relocate to another TS with a lower rank, that is one earlier in the time frame. This relocation policy reduces substantially the possibility of collisions in the configuration channel. If two or more AT's try to start working during the same time frame (TF), their transmissions may collide, but the collision is identified and corrected by means of randomly allocating lower rank TS. The probability of collision in the data channels (DC's) is almost zero for AT's, since the reservation channel information exchange has already ensured such a collision-free transmission, either by way of the chosen data channel for transmission (FDMA).

The power level of the modem for the configuration channel (CC) information is greater than that of the modem for transmitting data on the data channels (DC), since an AT must first send out connectivity information with enough power to reach other AT's of its respective service set (SS). Once this has been done, and a routing path determined, which routing path will indicate the first AT that shall constitute the first hop or link of the routing path, which hop is closer to the requesting AT than at least most of all of the other AT's of the SS, the other modem dedicated to the transmission of data on the DC's will only have to transmit at a power level less than that of the modem dedicated to the configuration channel. Thus, since applications data (AD) are transmitted at a lower power than that of the configuration data (CD), the condition for collision in data channels can be identified before it occurs, with appropriate measures being taken for preventing it, such as the use of CDMA. In addition, since the data channel data is transmitted at a lower power level, interference is reduced since the RF waves of the data channels do not propagate as far along the SS. It is noted that in the case where the primary modem is used most of the time for transmitting both configuration data as well as channel data, with the dedicated reservation-channel modem only being used when the primary modem is occupied with sending out messaging on the data channels, the primary modem will have its power level changed in accordance with which channel it is transmitting, as disclosed in copending U.S. application Ser. No. 09/705,588. However, in the preferred form of the invention, the dedicated configuration-channel modem receives and transmits configuration data regardless of the state of the primary modem.

At very heavy loading, the degradation of the service provided by the protocol of the present invention is expected to remain constant, in contrast with prior-art polling-type protocols that collapse abruptly in similar conditions.

Operation

When first powered on, or when approaching a group, the new terminal (AT) listens to messages in the time frames (TF), creates a utilization map based thereon, and computes its transmit power, in the manner disclosed in copending U.S. application Ser. No. 09/705,588. According to the protocol of the present invention, it submits the first message in the last time slot (TS) of the time frame, using as much power as needed in order to reach all AT's from which it has received similar messaging, that is its service set (SS). The message shows the utilization map it knows about, and requests to register with the closest AT (smallest signal loss). In the utilization map, it marks as busy all time slots (TS) during which a message or high-level noise was received during the last time frame, and also marks the time slot where it intends to move to with the next frame. The TS where it wants to move in the next time frame will have been reported as free in utilization maps of all AT's of the SS. In every time frame, the AT creates the utilization map based on time slots it identified as being busy (a signal was received during the TS), and it receives similar maps from all other AT's in the transmit-set of each AT (TxS). Identifying free TS's consists in making a bit-wise OR between all received maps. The result shows free time slots as bits with value zero and busy TS as bits with value one.

The Configuration Channel (CC) is used for passing two kinds of messages: connectivity and data transfer plans. All messages in the connectivity group contain the utilization map, the power used for transmitting the message, and the level of environment noise at a transmission site, beside other, specific, conventional information. These messages register, un-register, and communicate the respective AT status. The status message is transmitted whenever no other message is pending in order to maintain connection.

The group of messages for data transfer planning is used for adjusting the transmit power, building, re-building, re-routing and releasing links, as described hereinbelow in detail. As disclosed in copending U.S. application Ser. No. 09/705,588, some of them are used before starting the transfer of data packet, and some are used while the data transfer takes place. Data Channels (DC's) are mainly used for moving data packets from one AT to another. Some of the data transfers require confirmation/rejection of received data, and some not. A rejection of received data is an automatic request for retransmitting the associated data package. Broadcast services do not require any confirmation of received data correctness.

Connectivity

Connected Network

In order to talk to the "world", each AT should be connected directly or indirectly to a gateway that connects the AT's of the service group of AT's (SG) to an outside network, such as a cellular network, PSTN, and the like. When it is connected indirectly, the connectivity is realized through another AT or AT's. An AT loses its connectivity if an uplink AT (an AT closer to the gateway along the connection path) becomes out of range (cannot be heard anymore), or if the uplink AT loses its connectivity. The AT so losing its connection will look for the closest (smallest signal loss) connected AT providing the smallest path loss of signal, and reconnect through it. If no connected AT is found in the current service set (SS), the disconnected AT will send out status messages every time frame (TF). The transmit power of that AT is increased one dBm every other TF, until another, connected AT answers back. If after reaching the maximum transmitting power (28 dBm) no connected AT can be included in the SS, the AT and its SS are considered as isolated. An SS can be isolated only if the SG containing the SS is isolated, also. An isolated AT will adjust its power according with the power and space topology of its SS. Periodically, isolated AT's will transmit messages using the maximum transmitting power until it is heard by a connected AT that provides the connectivity to the world via a gateway. While an SG is isolated, the services can be provided only between those terminals-members of the service group (SG). An AT that has no service set (SS) will send out messages every 60 seconds using the maximum power. The self-testing functions will be activated before sending out any high-power message to verify hardware viability, since improperly working AT's can disable the network by sending out interfering signals.

When the AT is powered on, it listens to the transmit set (TxS) from other AT's. It identifies the path loss for each TxS member by subtracting the strength level of the received signal from the transmit power. The highest path loss is used for setting the current transmit power in the configuration channel (CC). The new AT submits a registration request to the closest (smallest path loss) connected AT in the last TS, as described above. The registration request is forwarded to a gateway for use by the LLC layer software. Each terminal along the path remembers the fact that it helped to register the new AT. The first uplink AT is responsible for monitoring the activity of the newly registered AT, and submits a request to unregister it in case it becomes out of range, or if it was heard requesting registration with another AT.

Figure 3:
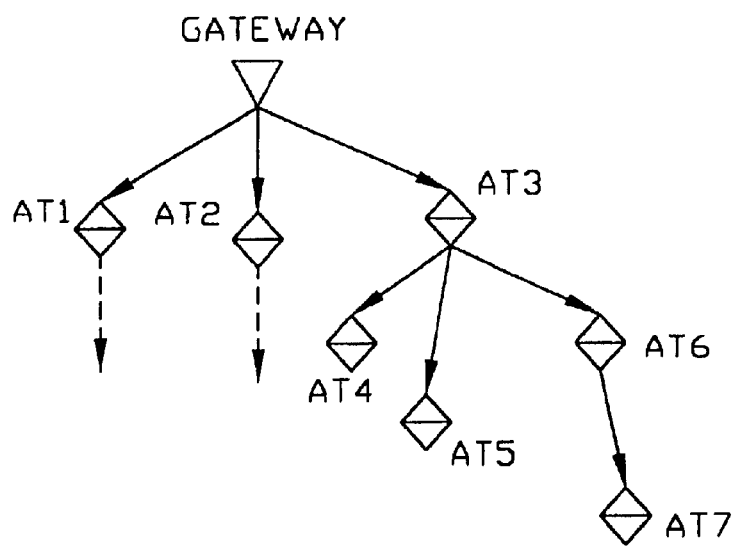
FIG. 3 is a depiction of the many terminals (AT) connected to a particular gateway of the system of the present invention connecting the terminals to an exterior network, with one particular AT entering the service domain thereof and the connection path thereof.

Referring to FIG. 3, AT7 is shown entering the network. The connecting process and the information held at each AT in this network is as follows:

AT7 1. Submits the registration request to AT6;
2. Monitors the evolution of path loss to all received AT's and adjusts the transmit power according with path loss variation and noise level in each AT area; if AT6 is predicted to get out of range in next 5 seconds, AT7 searches for another AT to connect through;
3. Monitors the registration status of the AT6.

Connectivity data: Uplink—AT7 Downlink—none:

AT6 1. Submits the received registration request of AT7 to AT3;
2. Monitors the path loss to all received AT's and adjusts its own transmit power according with path loss variation and the noise level in each AT area; if AT7 becomes out of range, it submits to AT3 the request to unregister AT7;
3. Monitors the activity of AT7; if it identifies that AT7 requests registration with another AT, AT6 submits to AT3 the request to unregister AT7;
4. Monitors the evolution of path loss to AT3; if AT3 is predicted to get out of range in next 5 seconds, it searches for another AT to connect through;
5. Monitors the registration status of the AT3.

Connectivity data: Uplink—AT3 Downlink—AT7:

AT3 1. Submits the received registration request of AT7 to Gateway;
2. Monitors the path loss to all received AT's and adjusts its own transmit power accordingly; if any of AT4, AT5 or AT6 becomes out of range, submits to Gateway the request unregistration the AT;
3. Monitors the activity of AT4, AT5 and AT6; if any of them requests registration with another AT, submits the un-register request to the Gateway;
4. Monitors the evolution of path loss to Gateway; if it is predicted to get out of range in less than 5 seconds, it searches for another AT (or gateway) to connect through.

Connectivity data: Uplink—Gateway Downlink—AT4, AT5, and AT6/AT7:

Gateway
1. Submits registration of AT7 to the global database;
2. Monitors the evolution of path loss to all AT's it can receive and adjusts its own transmit power accordingly.

Connectivity data: Uplink—world Downlink—AT1/ . . . , AT2/ . . . , and AT3/AT4, AT5, AT6, AT7.

The registration process creates a tree structure rooted at the gateway. Each AT knows the uplink through which it registered, and the list of direct downlinked AT's from the AT requesting registration. To each direct downlink is associated the list of AT's registered through it. If any AT is turned off or loses the connection with its uplink, the uplink submits the request to unregister the AT that has lost the connection and all its downlink AT's. The unregistration requires all AT's receiving and transmitting to remove the information about the unregistered AT's from their lists.

The Gateway sends to the Global Database only registration requests. As a result, the Global Database remembers the Gateway where the AT was connected last time.

Figure 4:
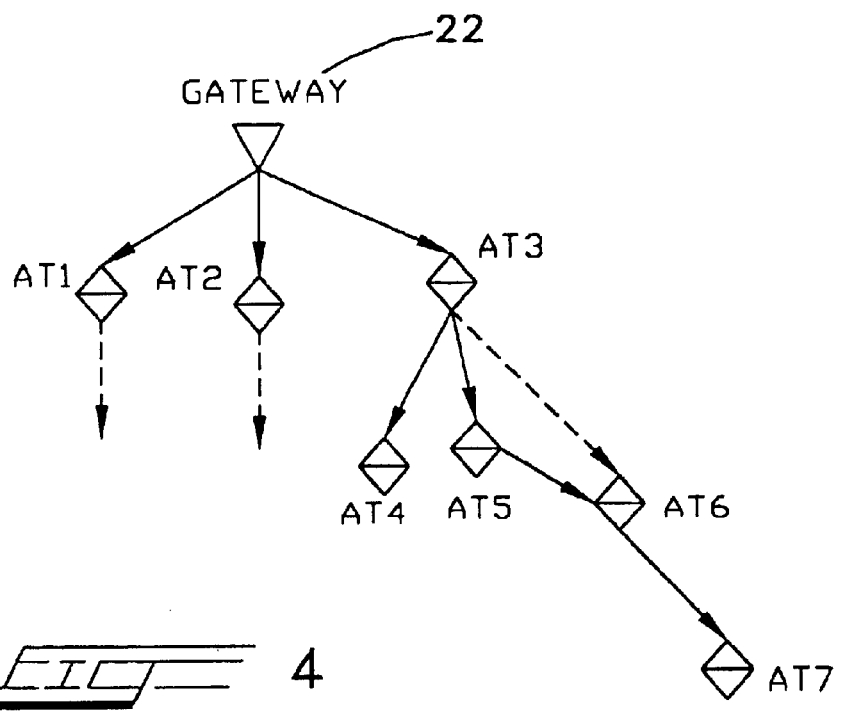
FIG. 4 is a depiction similar to FIG. 3, but showing the particular AT moving away from the gateway and other AT's, whereby disconnection or reconnection must be carried out.

Referring now to FIG. 4, it is shown the case where AT6 is moving away from AT3, with which it had been registered and by which it had been connected to the gateway 22. As result, it requests to register with AT5 by sending a message thereto. AT3 listens to this request, and submits to Gateway 22 the request to unregister AT6 and AT7. If AT3 cannot hear AT6 requesting to re-register, it means that the AT6 is out of the range of AT3 and that AT3 must submit to Gateway 22 the request to unregister AT6 when the condition occurs. If the request from AT5 to register AT6 comes before the time-out, AT3 has only to update the connectivity data by moving the AT6 downlink list to AT5 downlink list.

If AT3 can hear AT6, the process develops as follows:

The "unregister list" contains all AT's to be unregistered. No registration request is processed if the "unregister list" is not empty.

All operations described herein are executed in the configuration channel (CC) only. If any of the AT's involved in connectivity update are supporting data transfer at the time, the data transfer is not affected.

Isolated Network

When powered on, each terminal is isolated. The AT tries to find a registered AT and register to the world through it using the last time slot of a time frame, as described above. The search consists in sending out status messages and listening for answers. At first, the AT listens in the configuration channel (CC). If no other AT can be heard, it transmits the status message in a time slot (TS) randomly selected. With every time frame (TF), it increases the transmitting power until a response is received. The response may be

| Frame | Transmit | Transmit data | Transmitter Update | Receiver | Receiver Update |
|---|---|---|---|---|---|
| 1 | AT6 | Self register with AT5 | Replace uplink AT3 with AT5 | AT5 | Open AT6 downlink list |
| 1 | | | | AT3 | Move AT6 downlink list (AT6 and AT7) to un-register list |
| 2 | AT3 | Un-register AT6 | Remove AT6 from un-register list | Gateway | Remove AT6 from AT3 downlink list |
| 2 | AT5 | Register AT6 | | AT3 | Add AT6 to AT5 downlink list |
| 2 | AT6 | Register AT7 | | AT5 | Add AT7 to AT6 downlink list |
| 3 | AT3 | Un-register AT7 | Remove AT7 from list | Gateway | Remove AT7 from AT3 downlink list. |
| 3 | AT5 | Register AT7 | | AT3 | Add AT7 to AT5 downlink list |
| 4 | AT3 | Register AT6 | | Gateway | Add AT6 to AT3 downlink list |
| 5 | AT3 | Register AT7 | | Gateway | Add AT7 to AT3 downlink list |

If AT3 cannot hear AT6, the process develops as follows:

| Frame | Transmit AT | Transmit data | Transmitter AT Update | Receiver AT | Receiver Update |
|---|---|---|---|---|---|
| 1 | AT6 | Self register with AT5 | Replace uplink AT3 with AT5 | AT5 | Open AT6 downlink list |
| 2 | AT5 | Register AT6 | | AT3 | Add AT6 to AT5 downlink list. Since AT6 was a direct downlink, all its downlink list is moved to un-register list. |
| 2 | AT6 | Register AT7 | | AT5 | Add AT7 to AT6 downlink list |
| 3 | AT3 | Un-register AT7 | Remove AT7 from un-register list | Gateway | Remove AT7 from AT3 downlink list. |
| 3 | AT5 | Register AT7 | Add AT7 to AT6 downlink list | AT3 | Add AT7 to AT5 downlink list |
| 4 | AT3 | Register AT6 | | Gateway | Add AT6 to AT3 downlink list |
| 5 | AT3 | Register AT7 | | Gateway | Add AT7 to AT3 downlink list | from a gateway 22 or other AT's. In the next step, the AT requests the registration with one of the correspondents in the following priorities: The closest gateway, the closest AT registered with the world, or the closest AT registered with an isolated network. If no response is heard and the transmitting power is at maximum level (28 dBm), the AT is, therefore, isolated, and becomes the "root" of an isolated network (IN). The identification of the IN is the time in seconds since the Jan. 1st, 2001 when the AT was powered on. or another similar method.

All members of an isolated network (N) send out the status message at maximum power level (28 dBm) at a random rate, varying between 10 and N seconds, where N is three times the number of members in the IN. The message is sent in the last time slot (TS) of the first time frame (TF). AT's in the same IN do not adjust their power based on the message received during the last TS of the first TF. The message is intended to identify the possible connectivity to another IN or to connected networks. The AT, including the root, that can hear AT's from more than one isolated network (N), should request registration with the closest AT member of the IN with the largest identification number (the older). This method will collapse two or more IN into one iN with a tree tructure similar with the structure of a connected network (CN).

Routing

Most of the time, AT's are connected to the world through a gateway or gateways 22. In some particular cases, a group of AT's can be isolated from the world, if no finctioning gateway is available. Routing data through an isolated network (IN) is no different than routing data through a connected network (CN).

Powering a Link

For supporting the transfer of data between AT's, the protocol (AP) of the present invention uses the concept of a "link". The link is the selected route connecting the source AT to the destination AT or gateway, and includes: The type of service provided, such as voice, data or video; the time slot (TS) used on each AT hop for transporting data; and, indirectly, the application instantiation. Between an AT and a gateway there may be active in the same time many links each supporting another application or instance of the same application. Application data is usually transferred between the AT and associated gateway by the link, using a sequence of many AT's. The AT-connectivity process creates a connectivity path between the terminal and its gateway. The connectivity path uses the smallest possible power, which, therefore, implies the use of a large number of hops and a large pipeline delay, which is permissible when the class of service is data transfer.

Figure 5:
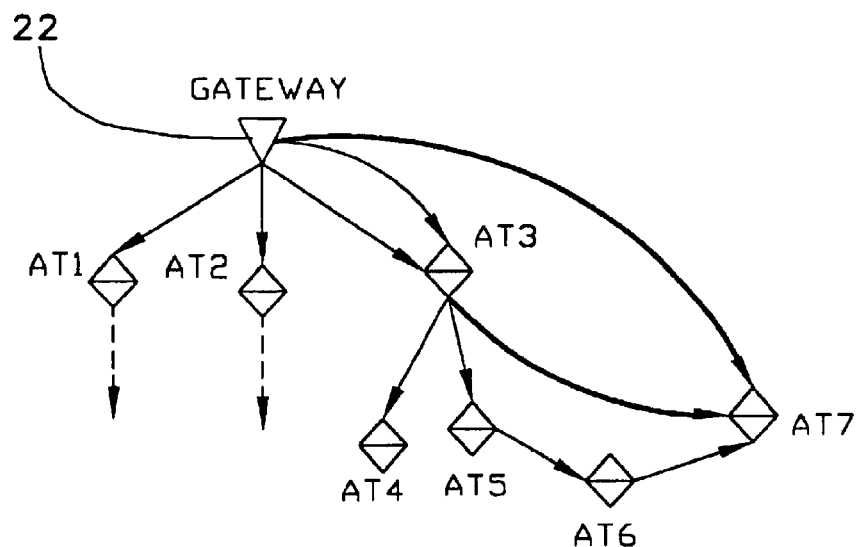
FIG. 5 is a depiction similar to FIGS. 3 and 4, showing a gateway connecting the system to outside networks, which connection path does not require very high speed, and where the total energy for passing data along the route is minimized.

Referring now to FIG. 5, there is shown the connection path of: Gateway->AT3->AT5->AT6->AT7. This may be used to support the link that passes data for applications not requiring very high speed, or accepting large delay or latency. Thus, the total energy used for passing data along this route is the smallest possible. Over the connectivity created by the longest path, one has the route Gateway->AT3->AT7 that has only two hops, and may be used for exchanging data with applications requiring smaller delays such as voice or video transmission. The connectivity route Gateway->AT7 has one hop only, but it requires much more energy than any other route. A high-energy route implies the use of high transmit power for transmitting the data. According to the present invention, in order to prevent unexpected interference, the transmitting power in the data channels (DC's) are the same or lower than the transmitting power in configuration channel (CC). In order to ensure the full cooperation between AT's, the whole service group (SG) will adjust its power in the configuration channel (CC), even if only one route has a real need for it, as described hereinbelow.

The use of high transmit-power has two side effects. It drains the battery of mobile AT's faster, and reduces the availability of system resources, making it difficult to reuse frequency and time slots. If the connection path between the gateway 22 and the client AT has $N_1$ hops, and the gateway power is $P_1$, and the length of the connection route should be no more than $N_2$ hops, the new power to be used at each end of the path is $P_2$:

$$P_2 = P_1 + \left\lceil 30\lambda \log_{10}\left(\frac{N_1}{N_2}\right) \right\rceil dBm \qquad (0\text{-}1)$$

Equation (0-1) provides a means to compute the new, greater power $P_2$ that should make the path to have only $N_2$ hops. The parameter $\lambda$ is the "space absorption" factor. Its value is dependent on many factors, including the propagation media characteristics, such as free space, concrete walls and floors, wooden walls, metal frame structure, foliage, and the like, lateral reflections, vertical reflections, etc. The initial value for $\lambda$ may be 1.0, but it should be adjusted based on system reaction to the intent to the changing of the number of hops.

The corrected power is applied at the gateway and at the client AT, a fact that attracts automatic change of the power profile along the entire connection route. If the correction does not have the expected result, a second correction will be applied after the route has been established.

Messaging Based on Least Energy Routing

The protocol of the present invention is based on least energy routing determination, as discussed previously, especially when transmitting data. The routing table messaging that is exchanged between terminals may have a format as that disclosed in copending, commonly-owned U.S. patent application Ser. No.09/815,164, filed on Mar. 22, 2001, entitled "Prioritized-Routing for an Ad-Hoc, Peer-to-Peer, Mobile Radio Access System", which is incorporated by reference herein.

The following algorithm of the protocol of the present invention is based on this minimum energy routing.

```
source-routing (message_ptr,msg-length,destination, msg-type)
/* source based routing including link adaption algorithm
*/
opt_route(destination, msg_type)
/* determine optimal route to destination this will return the best available
    route based on Class Of Service (COS) from msg_type and other
    network parameters including link quality. The returned information
    will be used to calculate the data rate
and power level
*/
calc_symbol_rate (sym_rate)
calc_code_rate (code_rate)
calc_pwr_level (pwr_level)
send_msg(RTS,msg_length,destination,sym_rate,code_rate,pwr_level)
/* send RTS to first router and await CTS to send the data packet
```

Linking

The protocol (AP) of the present invention defines permanent and temporary links. A permanent link remains active until it is changed or released, while a temporary link is used only once. Permanent links are used for transmitting any type of information, such as voice, data and video. The subsystem providing the information may not be able to provide it at a constant rate while the link is being planned. If there is no information to be transmitted when the transmission time comes, the AT sends a "maintenance" package which has no other reason other than to maintain the link active, and to give the next hop the opportunity to measure and reply regarding transmission quality. The maintenance packages are also created at a gateway 22 when the land-network is late and provides no data, or at any AT that receives incorrect data and has no data in link queue. The maintenance packet is dropped if the receiving AT has data packets in link queue. Otherwise, the maintenance packet is sent to next AT in the link. A hop of the link is released (removed from AT data structures) when no data, no maintenance packet and no noise is received in the first time slot (TS) of the link hop. The lack of transmitted data is always followed by an abundance of data exceeding the capacity of the planned link. Packets of data have to be stored and planned for transmission in proper sequence order. A configuration parameter, combined with measurements of delivery rate, is used for identifying when the amount of accumulated data requires special action. Such action could be to drop some data in excess, or to send out some of it using temporary links.

The permanent link is initiated when a service calls the client AT or the client AT calls a service. The source AT and the gateway identify the depth, the number of hops between the gateway and the AT, of the client AT. The required number of hops is computed according with service requirements. The gateway and client AT transmitting power in the configuration channel (CC) is computed using equation (0-1). For each hop, the power in the data channels (DC) is computed based on power loss to the next hop. If needed, the power used in the configuration channel (CC) is increased, such that it is at least 2 dBm higher than the data-channel transmits power. The transmit plan is built using only free TS's and TF's. The link message transmitted to the next hop contains the transmitting plan. If any member of the service set (SS) identifies any conflict in the transmitting plan, it answers back showing the channel and the map of the time frame (TF) conflicting with the plan. In such case, a new plan is issued using the newly achieved information. When the plan has no conflicts, the next hop accepts it by issuing a confirmation.

Figure 6:
FIG. 6 is a depiction of the time frames (TF's) with time slots (TS's) of the protocol of the system of the present invention required for performing one hop between terminals (AT's) for a permanent link, in order to assure proper communication.
Figure 6:
Figure 6:

Referring to FIG. 6, it takes at least two time frames per hop for making the connection. In the first time frame (TF), the transmitting AT sends out the transmit plan as a Request-To-Send (RTS) message. In the next TF, it may receive rejections from other AT's, including the next AT in the route as Not-Clear-To-Send (NCTS) messages. If there are rejections, the transmitting AT issues a new transmit plan and sends it out in a third TF. The receiving AT can send the Clear-To-Send (CTS) message in the third TF, but it also has to listen if no transmit plan was reissued during the same frame. For assuring proper communication, the transmit-plan issued at AT11 must not use for transmitting data the time slots (TS) that AT11 and AT12 are using for communication in the configuration channel (CC). When the permanent link is not needed anymore, a message that requests releasing the link is issued.

A temporary link is initiated when the amount of informational data pertaining to a permanent link passes over a predefined limit, and it is too large to cover the network jitter. The initiator AT sends a request for a temporary link which includes the transmit plan. If any member of the service set (SS) finds any conflict in the plan with the currently assigned time frame (TE) and time slot (TS), the information on conflicting data channel is transmitted. The issuer AT has to make another plan and re-transmit it. When no NCTS is received and the next hop confirms the plan, the source can send the data packet. It takes at least three TF's to fully define a temporary link. It means that the temporary link must target time slots that are in time frames at least three TF's ahead.

Local Link

Figure 7:
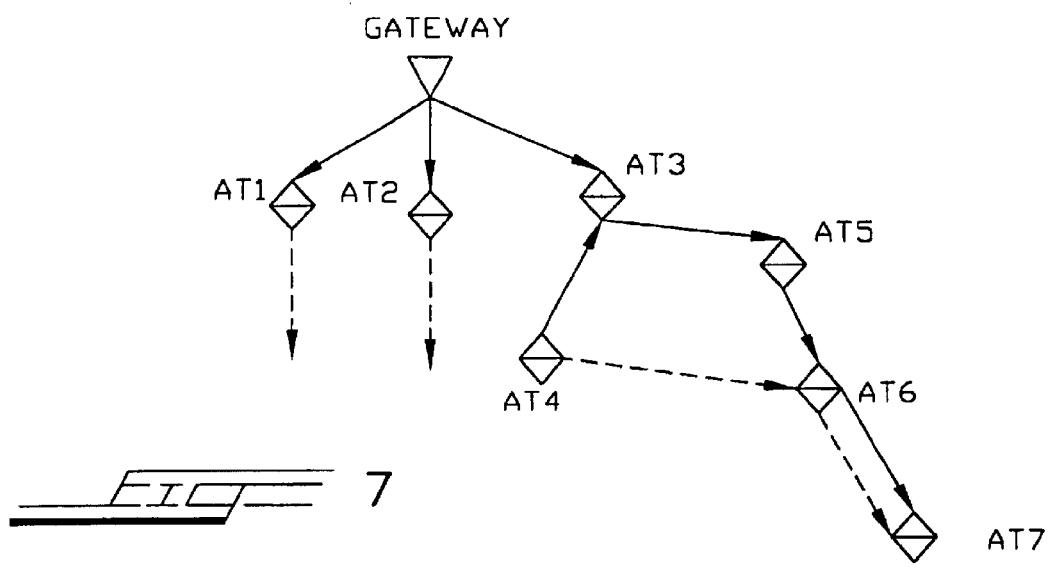
FIG. 7 is a depiction similar to FIGS. 3–5, but showing the connecting route between two AT's of a local link, in order to control power requirements of the AT's.

The local link is defined as a link between two AT's connected to the world through the same gateway or two members of the same isolated network (IN). FIG. 7 shows the connecting route between AT4 and AT7. AT4 requested the link to AT7. Depending upon the type of required service, it increases its power, and sends the request for power adjustment to AT7. The request is used for identifying a connection route between the source and destination, and to control the power at both ends based on service requirements. Since AT4 does not know where AT7 is located, it issues the power control message toward the gateway or the root AT. AT3 receives this request and finds AT7 in the AT5 downlink list. It then directs the message toward AT5. AT5 directs the request to AT6, and then AT6 directs it to AT7.

In local links, the request is always started at an AT, which sends it toward the gateway or root AT. While the requests advance, the destination AT is checked in local lists of each node. If it is found, the link-request is routed toward the destination. If the link-request arrives at the gateway and the destination AT is not in gateway list of registered AT's, the request is passed to the world that may reject it or connect to the service provider. In contrast with the gateway, the root of isolated network (IN) rejects the link if the destination AT is not in its registration list.

Building the Link

The process of building a link has two steps. In the first step, the request for setting the link power travels from the source to the destination. The trace of the message is saved in each AT along the connection route. The message carries information about the length of the path, which is incremented while the message is passed from one AT to the next. The power control request does not require confirmation. The sender listens in the next time frame (TF) if the next hop retransmits the message. If it does not, the message is repeated. The source increases its transmit power when sending out the power control request based on its distance to the gateway, or the root AT if in an IN. When the message arrives at the end of the connection path, the destination increases its transmit power in accordance with length of the path and service requirements. Then the destination sends out a dummy Clear-to-Send (CTS) message using the new power. As response to this message, all AT's that can hear it, and were part of the connection path for the link, answer with their Ready-To-Link (RTL) message. If the destination made a substantial change in transmitting power, it has to wait several frames until the service set (SS) stabilizes. After that, the source AT can select the proper AT from all of the answers from AT's in order to build the first hop, based on that AT's position along the connectivity route. While the link-hop is created using RTS/CTS/NCTS messaging, all AT's along the connectivity path that can receive the RTS/CTS/NCTS messages answer with a RTL message. When the second hop is ready to be built, the second AT in the link has data for selecting the next AT in the path.

In FIG. 7, it is shown that AT6 answered the dummy CTS submitted by AT7 while it was increasing its power. Then AT7 issued the RTS to AT6. While AT6 was confirming the link-hop by sending a CTS message, AT4 and AT5 received it, and answered with a RTL message. AT6 selected AT4 for the next hop because it has the smallest distance from the source as opposed to AT5.

Building the link takes a relatively long time in the protocol (AP) of the present invention, but after it is built, the link remains active for a long time. Disconnections due to network mobility are repaired while information is transferred, and do not require the redoing of the whole procedure. The power of each AT participating in the respective link is adjusted dynamically in order to maintain the proper service-quality and network connectivity.

Rerouting

For AT's not supporting a link, the transmitting power in the configuration channel (CC) is computed based on the AT's relative positions within the service group (SG). As an AT moves, it may re-register with the same or with another gateway. An active link is more rigid and follows the changes in the connectivity tree at a slower pace. The AT's supporting the link have their power in the configuration channel (CC) and data channels (DC) controlled by the group topology and the type of supported service. When an AT predicts that its uplink- connection will go out of range, or it is already out of range, it changes its uplink-connection and registers with another AT. The new registration may or may not change the gateway to which the AT was previously registered. After the registration request, the AT sends out the request for setting the transmit power and the request for rerouting the link(s). Then, it registers all sources and destination of supported links. Finally, the AT sends out the request to register all other AT's that have registered through it. Information from the gateway starts flowing through the new route as soon as it is connected. Information towards the gateway is directed to the new route after a delay of time frames depending on the type of service provided. For slow connections, such as data, the delay is twice the requester distance to the gateway. For fast connections, such as voice and video, the delay is equal with the requester distance to the gateway.

Re-link

Each data transmission is confirmed with an acknowledge (ACK) message. NACK message is used for marking improperly received data that have to be retransmitted. The failure of data reception can be caused by multi-path, co-channel or adjacent channel interference. Usually, lowering the transmission rate solves the multi-path interference. Re-planning the link segment solves the co-channel and adjacent channel interference. A RELINK message is used for establishing a new transmit plan between two adjacent AT's of the same link.

Length Adjustment

The destination AT of the link can measure the delay and can decide to reduce it. The adjustment process starts with increasing the power in the configuration channel (CC) and sending the power-request message to the source. A dummy clear-to-send (CTS) message is issued for selecting the AT for the first hop of the link. The re-link request is sent to this AT that continues the process, until it reaches the source. The re-link request travels against the informational flow. Information is directed onto the new segments of the route at the AT's shared by the new and old routes. The old segments of the route are released, since no data is sent through them anymore.

After rerouting a link, the destination AT could receive the data packets in incorrect sequence. Therefore, late, out-of-sequence packets get the highest transmission priority.

Power Control

The control of power is important for maintaining the connectivity between service group (SG) members and the quality of informational transfer.

Oscillation

The service group (SG) of AT's using the protocol (AP) of the present invention has the tendency to stabilize at a power profile that reflects the relative path loss between terminals. This "stabilization" is not 100% accurate, because decisions made at one time frame (TF) are based on measurements made during the previous TF. At the time the decision is applied, the group has already changed its status. For this reason, the group power-profile may have oscillations around its stable position. For preventing this oscillation, the transmit power in the configuration channel (CC) is filtered using the power used in last three time frames (TF's). If there is a repeat of the transmit power-level in last three TF's, the current transmit power-level is computed with the average between the currently computed power-level and the transmit power-level used in previous TF; otherwise the last computed power-level is used as transmit power-level.

Variation

In the configuration channel (CC), each AT listens to all terminals and measures the level of the received signals. The difference between the transmit power-level that is part of the received message and the power-level of the received signal provides the measure of the loss of signal due to propagation. After listening to its service set (SS), a AT selects the largest path loss and adjusts its power-level to be able to reach that terminal at a power-level higher than the local noise. The protocol of the present invention makes the supposition that the path loss between any two terminals is symmetrical, excepting for local noise. In reality, the computed "signal loss" is not symmetrical in both directions, as receiver sensitivity and transmitter efficiency have variations from one terminal to another due to parts variety, manufacturing process, tuning, or terminal aging. The protocol (AP) of the present invention can properly control channel access if these variations are less than ±5 dB.

Each AT keeps historical data about path-loss evolution for predicting the connection-status in next 3–5 seconds. Equation (0-2) provides a simple method for acquiring the path loss variation, as described below. From measurements $P(t_1)$ and $P(t_2)$ of the path loss at time $t_1$ and $t_2$, the average path loss variation $\delta(t)$ is computed using an IIF:

$$\delta(t_2) = (1-k)\delta(t_1) + k\frac{P(t2) - P(t_1)}{t_2 - t_1} \quad (0\text{-}2)$$

The factor k has a very small value (0.01 for example) that are identified empirically. If the measurements are performed every time frame (TF), the difference $t_1-t_2$ is always one. Then the equation becomes:

$$\delta = (1-k)\delta' + k(P-P') \quad (0\text{-}3)$$

In this equation, P and P' are the values of path loss measured in the current and the previous time frames (TF's), and δ and δ' are the values of the average variation of the path loss for the current and previous TF.

The average value of the path loss is computed with equation (0-4):

$$L=(1-k)L'+kP \quad (0\text{-}4)$$

In this equation, L is the average path loss, L' is the previous average path loss, P is the last measured path loss, and k is the same filtering constant as before. The predicted value of the path loss after m time frames is computed with equation (0-5):

$$PL=L+m\delta \quad (0\text{-}5).$$

If the predicted value of the transmit power that is computed based on the predicted path loss and the noise at correspondent AT is larger than 28 dBm, the connection will be lost in m time frames. Since the increase of power in one AT can cause the whole group to increase the transmit power, the AT may decide to re-register using another AT if it is possible, where such decision may reduce substantially the transmit power. After re-registering, the AT that supports at least a link should request to reroute it.

Optimization

Figure 8:
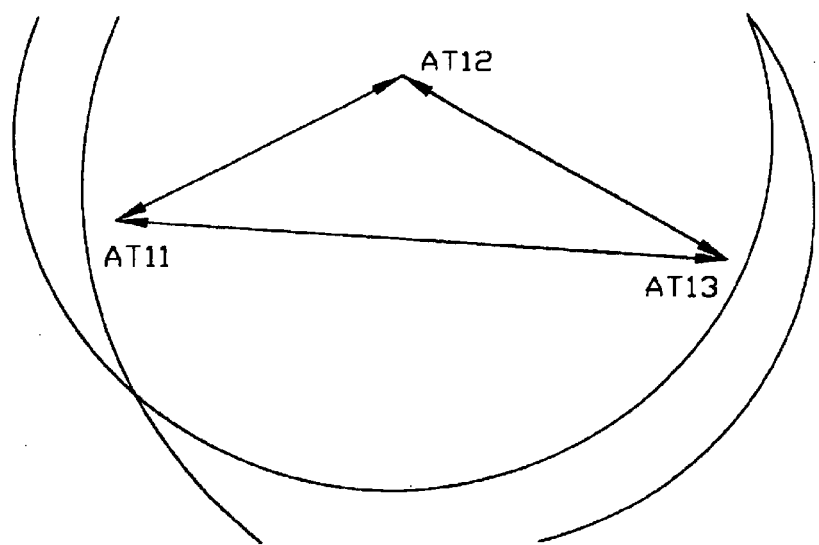
FIG. 8 is a graphical depiction showing an AT approaching a group of AT's and the closed triangular connection therebetween.

When an AT moves away from its service group (SG), the transmit power is increased in order to maintain the connectivity. When an AT moves closer to its SG, the connectivity is preserved, if using the current power-level, but this may not be economical. In FIG. 8, there is shown AT13 approaching its service group (SG). The transmitting power of all members of this group is high enough to allow each AT to communicate with the other two. If AT11 and AT13 reduce their power, they can still be connected through AT12. The condition supporting the decision to lower the power of AT13 and AT11 is that AT12 must be able to talk with both of them.

Figure 9:
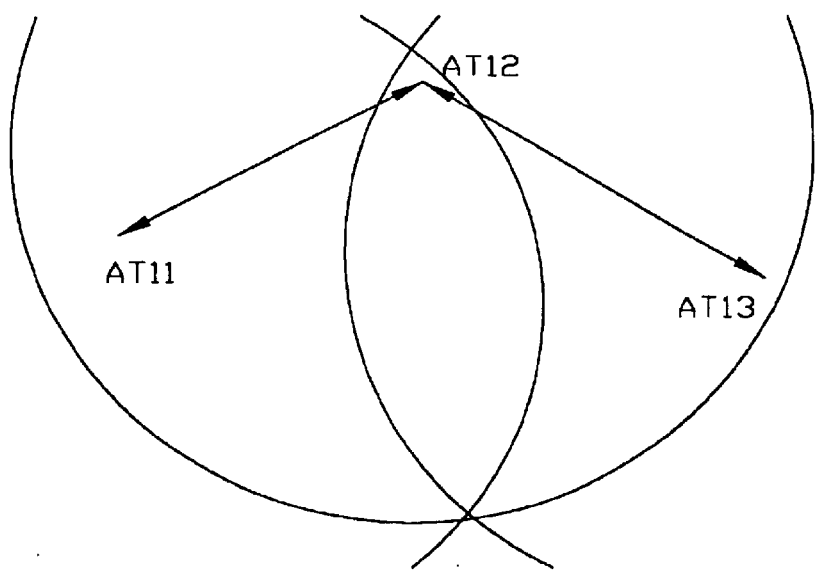
FIG. 9 is a graphical depiction similar to FIG. 8 showing the open triangular connection therebetween if the AT's experience power reduction, whereby connection is preserved via the intermediate AT with ensuing reduction in energy loss.

In FIG. 9, there is shown the transmit area of each AT after lowering the transmitting power. AT12 is located in the intersection of transmit areas of AT11 and AT13, while AT11 and AT13 are in the transmit area of AT12. It means that at this power profile, AT12 can communicate with AT11 and AT13, but AT11 and AT13 cannot communicate with each other. The system's total transmit power is smaller than it was before. The procedure can be repeated until no triangle is formed. This procedure requires that AT11 and AT13 know that both of them can talk to AT12. The information must be achieved by listening to network "talk" which can be incomplete at any time.

The same effect can be achieved through a much more simple procedure. The system of AT's has the tendency to stabilize at a particular power profile. After applying a perturbation, the system returns to the same or to another stable state. If the perturbation consists in lowering the power, the new stable position will be, conditions permitting, at a lower power. As with the triangle method, the perturbation should be applied to all AT's in the system at the same time.

Figure 10:
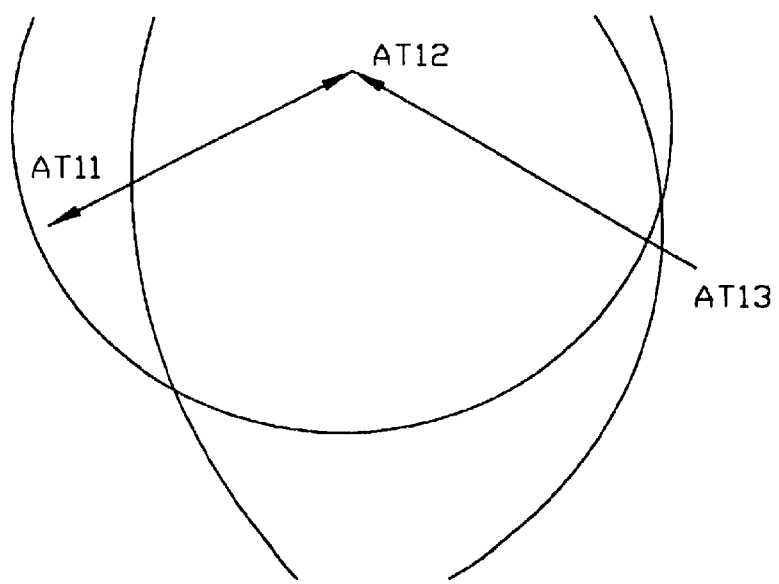
FIG. 10 is a graphical depiction similar to FIGS. 8 and 9 showing the perturbed power profile of the AT's and the connection therebetween after the lowering of the power of all of the AT's.

In FIG. 10, there is shown the situation after lowering the power of all AT's by one dBm. While using the perturbed power profile, AT11 can hear only AT12, AT12 can hear AT11 and AT13, while AT13 cannot hear anybody. Based on this situation, AT11 identifies that it can remain connected to AT12 while using a lower transmit power. AT12 identifies that its transmit power is too low for maintaining the connection to AT13. AT13 considers itself isolated because it cannot hear anybody, and, therefore, increases its transmit power by 1 dBm.

Figure 11:
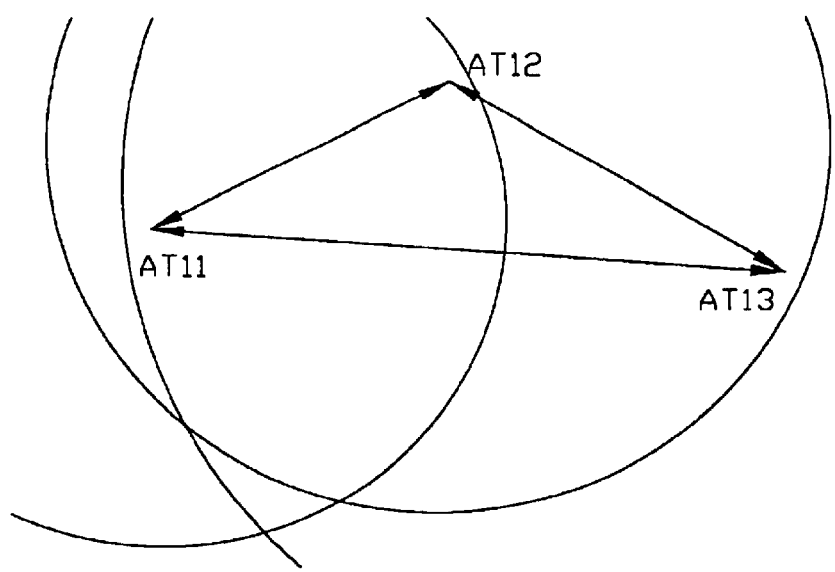
FIG. 11 is a graphical depiction similar to FIG. 10 and showing the closed triangular connection therebetween after one time frame after power perturbation.

In FIG. 11, in the next time frame, AT12 and AT13 return to the power level they had before the perturbation, while AT11 uses only as much power as needed for remaining connected to AT12. In the next time frame, AT11 can hear AT12 and AT13, but it uses too little power to transmit to AT13. It decides to increase to the level it was using before the perturbation. The oscillation filter identifies it as a possible oscillation and does not allow an increase larger than half of the increment. AT12 can hear both AT11 and AT13 and finds that its current transmit power is correct for talking with both AT's. AT13 can hear only AT12. It finds out that the power it uses for such connection is too large, and computes the new, lower transmit power using data collected from AT12.

Figure 12:
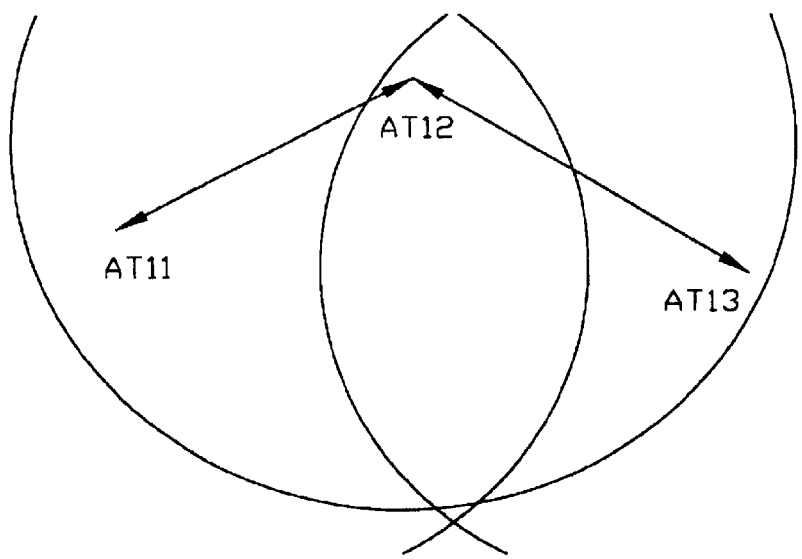
FIG. 12 is a graphical depiction similar to FIG. 11 and showing the open triangular connection therebetween after two time frame after power perturbation with the ensuing steadystate, energy-saving path-connection between the AT's.

In FIG. 12, there is shown the situation two time frames after applying the perturbation. AT12 and AT13 are both using the right power level for providing the connection. AT11's transmit power is too high to talk to AT12, the only AT it can hear. With next time frame, AT11 will reduce the power to the proper level. After that reduction, all AT's will have the same transmit power as the power computed using the triangle method.

Both methods require that the algorithm be executed in the same time frame on all AT's. The triangle method can be applied every time frame or only at predefined times. The perturbation method can be applied only from time to time, but no sooner than 5 time frames to allow the group to get at a stable power.

The triangle method provides the final power profile after one time frame, but it requires special computation for identifying which triangle can be broken. The information needed for this method is collected while listening to other AT's talk, a fact that may not be possible when supporting an active link.

The perturbation method requires three time frames to get to the right power profile. It does not require special computation, as the power control algorithm is run every time frame anyway.

While a specific embodiment of the invention has been shown and described, it is to be understood that numerous changes and modifications may be made therein without departing from the scope and spirit of the invention as set forth in the appended claims.

What is claimed is:

1. In an ad-hoc, peer-to-peer radio system comprising a series of terminals where each said terminal is capable of making at least one of an outgoing call or receiving an incoming call, each said terminal comprising transceiver means for transmitting and receiving signals from other like terminals of said series of terminals, computer means and memory means for storing program software means therein, the improvement comprising:

said memory means comprising software means for creating connectivity messaging and data transfer plan messaging information for transmission to other said terminals, and for receiving similar said information from other said terminals from which said terminal can receive; said software means comprising means for delivering said connectivity and data transfer plan information messaging to a configuration channel for transmission to said other terminals belonging to the same service group (SG);

said connectivity messaging comprising a utilization map, the power used for transmitting the messaging, and the level of the environmental noise at the transmission site of the transmitting terminal;

said data transfer plan information messaging comprising messaging for use in changing the transmit power level and for determining routing paths; and said utilization map comprising information messaging on the availability of time slots of a previous time frame based on whether time slots were used in said previous time frame or were unavailable for use due to high-level noise;

said software means further comprising means for generating at least one optimal connection path of a call based on said messaging received from other said terminals in said service group (SG), whereby said call is routed to its destination by routing said call along a route utilizing at least one of some of said terminals of said series of terminals based on least-energy routing, so that the least amount of energy over a selected route is chosen for completing a call.

2. The ad-hoc, peer-to-peer radio system according to claim 1, wherein said means for generating at least one optimal connection path of a call based on said messaging received from other said terminals in said service group comprises determining the smallest path loss relative to said other terminals from which it has received similar messaging; said means for generating at least one optimal connection path of a call causing the said software means to initiate a request-to-register message in said connectivity messaging, whereby said terminal will register with the closest of said other terminals for serving as at least a first node of said optimal path.

3. In an ad-hoc, peer-to-peer radio system comprising a series of terminals where each said terminal is capable of making at least one of an outgoing call or receiving an incoming call, each said terminal comprising computer means, and memory means for storing program software means therein, the improvement comprising:

each said terminal of said series of terminals comprising a modem means for transmitting first communications information on at least one data channel (DC) at a first chosen power level, and for transmitting second communications information on a control channel (CC) at a second chosen power level;

said first power level being one of equal to or less than said second power level, whereby RF interference among said series of terminals is minimized.

4. The ad-hoc, peer-to-peer radio system according to claim 3, wherein said software means of each said terminal comprises means for generating communications-information based on time division messaging.

5. The ad-hoc, peer-to-peer radio system according to claim 4, wherein said communications-information comprises a series of time frames (TM) each divided into a series of time slots (TS); said communications-information comprising at least one time slot in which said control-channel messaging data is transmitted via said modem means, and at least two time slots in which is transmitted channel data (CD) messaging data via said modem means.

6. The ad-hoc, peer-to-peer radio system according to claim 5, wherein said software means of each said terminal for generating said communications-information based also generates said communications-information based on frequency division multiple access (FDMA), said software means for generating said communications-information transmitting said control-channel (CC) information at a first frequency, and said data-channel (DC) information at at least one other frequency different from said first frequency.

7. The ad-hoc, peer-to-peer radio system according to claim 6, wherein each said time frame comprises a first said time slot (TS) in which said control-channel (CC) information is transmitted at said second power level, and at least three other time slots (TS) in which said data-channel(DC) information is transmitted at said first power level;

said first time slot transmitting said control-channel information at said first frequency of F0, and said at least three subsequent time slots (TS) transmitting said data-channel (DC) information at frequencies of F1, F2, and F3, respectively.

8. A protocol for use in an ad-hoc, peer-to-peer radio system comprising a series of terminals where each said terminal is capable of making at least one of an outgoing call or receiving an incoming call, and where each said terminal comprising computer means, memory means for storing program software means therein, and where each said terminal is capable of being hop of a routing path connecting a call from a source to a destination, comprising:

software means for said memory means of each said terminal, said software means comprising means for generating communications-information for transmission based on time-division messaging;

said communications-information comprising a series of time frames (TM) each divided into a series of time slots (TS); said communications-information comprising at least one time slot in which control-channel (CC) messaging information is transmitted, and other time slots in which is transmitted channel data (CD) messaging information;

said at least one time slot transmitting said control-channel information at a first frequency of F0, and said other time slots (TS) transmitting said data-channel (DC) information at frequencies of F1, F2, and F3, respectively;

each said time frame (TF) comprising an inter-frame time gap (IFTG) at the end of each said time frame (TF) in which no communications-information is transmitted, whereby each said terminal is allowed time to perform necessary calculations.

9. The protocol for use in an ad-hoc, peer-to-peer radio system according to claim 8, wherein the length of each said time slot for transmitting said communications-information is equal to each other.

10. The protocol for use in an ad-hoc, peer-to-peer radio system according to claim 9, said software means further comprises means for switching transmission of initial control communications-information from said last time slot (TS) to another, free, earlier time slot of a subsequent time frame (TF) in order to reduce the chance of collision with other said terminals also initially registering.

11. The protocol for use in an ad-hoc, peer-to-peer radio system according to claim 10, said initial control communications-information in said last time slot (TS) and in said another, free, earlier time slot of a subsequent time frame (TF) are transmitted at a frequency F0 of said control channel.

12. The protocol for use in an ad-hoc, peer-to-peer radio system according to claim 8, wherein said at least one time slot (TS) for said control-channel (CC) information is transmitted at a first power level, and said other time slots (TS) for said data-channel (DC) information are transmitted at a second power level.

13. The protocol for use in an ad-hoc, peer-to-peer radio system according to claim 12, wherein said second power level is equal to or less than said first power level, whereby RF interference is reduced.

14. In a radio terminal for use in an ad-hoc, peer-to-peer radio system comprising a series of radio terminals, said radio terminal capable of making at least one of an outgoing call or receiving an incoming call, and comprising transceiver means for transmitting and receiving signals from other like terminals of said series of terminals, computer means and memory means for storing program software means therein, the improvement comprising:

said memory means comprising software means for setting the power level of a transmission of control-channel messaging to be transmitted by said transceiver means;

said software means further comprising means for generating routing messaging including said power level set by said means for setting for use in determining the connection path of a call;

said software means further comprising means for determining the optimal connection path of an outgoing call based on least energy use, so that the least amount of energy over a selected route is chosen for completing the call.

15. The radio terminal for use in an ad-hoc, peer-to-peer radio system according to claim 14, wherein said software means comprises message-generating means for generating a routing table based on said least energy use, said routing table comprising time-frame based messaging.

16. The radio terminal for use in an ad-hoc, peer-to-peer radio system according to claim 15, wherein time-frame based messaging is based on time division.

17. The radio terminal for use in an ad-hoc, peer-to-peer radio system according to claim 15, wherein time-frame based messaging comprises a series of time frames (TM) each divided into a series of time slots (TS), one said time slot being used for transmitting said control-channel (CC) messaging including said power level, said routing messaging, and said optimal path connection of an outgoing call based on least energy use.

18. The radio terminal for use in an ad-hoc, peer-to-peer radio system according to claim 17, wherein other time slots of said series of time-slots based are used for transmitting channel data (CD) messaging information.

19. The radio terminal for use in an ad-hoc, peer-to-peer radio system according to claim 18, wherein said one time slot transmits said control-channel information at a first frequency of F0, and said at other time slots (TS) transmit said data-channel (DC) information at frequencies different from said first frequency and different from each other.

20. The radio terminal for use in an ad-hoc, peer-to-peer radio system according to claim 18, wherein each said time frame (TF) further comprises an inter-frame time gap (IFTG) at the end of each said time frame (TF) in which no communications-information is transmitted, in order to allow time to perform necessary calculations.

21. The radio terminal for use in an ad-hoc, peer-to-peer radio system according to claim 20, wherein each said time frame (TF) further comprises a last time slot (LTS) at said first frequency in which is contained initial control communications-information indicating initial presence of said radio terminal in order to start communicating with other said terminals.

22. The radio terminal for use in an ad-hoc, peer-to-peer radio system according to claim 21, wherein said software means further comprises means for switching transmission of initial control communications-information from said last time slot (TS) to another, free, earlier time slot of a subsequent time frame (TF) in order to reduce the chance of collision with other said terminals also initially registering.

23. The radio terminal for use in an ad-hoc, peer-to-peer radio system according to claim 18, wherein said first time slot (TS) for said control-channel (CC) information is transmitted at a first power level, and said other time slots (TS) for said data-channel(DC) information are transmitted at a second power level.

24. The radio terminal for use in an ad-hoc, peer-to-peer radio system according to claim 23, wherein said second power level is equal to or less than said first power level, whereby RF interference is reduced.

25. A method of selecting an optimal routing path of a call in an ad-hoc, peer-to-peer radio system comprising a series of radio terminals, each said radio terminal comprising transceiver means for transmitting and receiving signals from other like terminals of said series of terminals, computer means and memory means for storing program software means therein, comprising:

(a) creating a service group (SG) of said radio terminals where each said radio terminal of said service group may be connected to any other of said radio terminals of said service group via at least one connecting path;

(b) creating in each said radio terminal of said service group (SG) via said software means connectivity messaging and data transfer plan messaging information for transmission to other said radio terminals of said service group, and for receiving similar said information from said other radio terminals;

(c) delivering said connectivity and data transfer plan information messaging to a configuration channel for transmission to said other radio terminals belonging to the same service group (SG);

(d) said step (b) comprising developing by said software means a utilization map, the power used for transmitting the messaging, and the level of the environmental noise at the transmission site of the transmitting terminal;

(e) said step (b) further comprising using said data transfer plan information messaging for use in adjusting the transmit power level and for determining at least one routing path.

26. The method of selecting an optimal routing path of a call in an ad-hoc, peer-to-peer radio system according to claim 25, wherein said step (d) comprises:

(f) developing said utilization map with information messaging based on time division on the availability of time slots of a previous time frame based on whether time slots were used in said previous time frame or were unavailable for use.

27. The method of selecting an optimal routing path of a call in an ad-hoc, peer-to-peer radio system according to claim 25, further comprising:

(f) transmitting said connectivity and data transfer plan information messaging to other said radio terminals of said service group of radio terminals via said configuration channel;

(g) receiving said connectivity and data transfer plan information messaging at said other radio terminals;

(h) determining the optimal routing path of a call to or from a said radio terminal based on said received connectivity and data transfer plan information.

28. The method according to claim 25, wherein said step (b) comprises:

(c) applying a power-perturbation to said service group of terminals to cause at least some of said terminals to adjust the power level to a lower value.

29. The method according to claim 28, wherein said time-dependent messaging is made up of a series of time frames with each time frame having a plurality of time slots, said step (c) comprising applying said perturbation in the same time frame on all said terminals of said service group.

30. The method according to claim 28, wherein said time-dependent messaging is made up of a series of time frames with each time frame having a plurality of time slots, said step (b) comprising utilizing at least three said time frames.

31. A method of reducing radio interference in an ad-hoc, peer-to-peer radio system comprising a series of radio terminals forming a service group, each said radio terminal comprising transceiver means for transmitting and receiving signals from other like terminals of said series of terminals, computer means and memory means for storing program software means therein, where a call for sending packet data from one radio terminal may be connected utilizing at least one other said radio terminal as a node in the routing connection of the call to a destination other said other radio terminal, comprising:
(a) transmitting connectivity messaging from said one radio terminal to at least one other radio terminal of said service group;
(b) said step (a) comprising transmitting said connectivity messaging using time division signaling having a series of time frames (TF) with each said time frame consisting of a plurality of time slots (TS);
(c) said step (b) comprising dedicating one of said time slots (TS) of each said time frame (TF) as a configuration channel in which said connectivity messaging is transmitted;
(d) said step (b) comprising dedicating other of said time slots (TS) of each said time frame (TF) as data channels in which data information messaging is transmitted;
(e) said step (b) comprising transmitting said connectivity messaging of said configuration channel of at a power level equal to or greater than the power level at which said data information on said data channels is transmitted. terminals of said series of terminals, computer means and memory means for storing.

32. The method of transmitting radio calls in an ad-hoc, peer-to-peer radio system according to claim 31, wherein said step (e) comprises making the length of said inter-frame time gap (IFTG) longer than the lengths of said time slots (TS).

33. A method of transmitting radio calls in an ad-hoc, peer-to-peer radio system comprising a series of radio terminals forming a service group, each said radio terminal comprising transceiver means for transmitting and receiving signals from other like terminals of said series of terminals, computer means and memory means for storing program software means therein, comprising:
(a) establishing a call from a said radio terminal based on time-division access;
(b) said step (a) comprising creating messaging consisting of a series of time frames (TF) with each said time frame consisting of a plurality of time slots (TS);
(c) said step (b) comprising dedicating one said time slot for use as a configuration channel for transmitting information useful in establishing a routing path of a call;
(d) said step (b) further comprising dedicating other of said time slots for use as a data channels for transmitting the actual call information;

(e) said step (b) further comprising forming an inter-frame time gap (IFIG) between said time frames (TF) during which each radio terminal may process said data received from another terminal.

34. In a method of transmitting radio calls in an ad-hoc, peer-to-peer radio system comprising a series of radio terminals, each said radio terminal comprising transceiver means for transmitting and receiving signals from other like terminals of said series of terminals, computer means and memory means for storing program software means therein, said radio system based on time-dependent messaging having multiple parallel data channels and a control channel, comprising:
(a) said radio terminal monitoring said control channel for information about the power level at which other said terminals are transmitting over said control channel; and
(b) adjusting the power level of said terminal based on the information received on said control channel in said step (a); and
before said step (a):
(c) said terminal transmitting a registration request signal over said control channel for registering with at least one of: another said radio terminal and a gateway;
(d) said step (a) monitoring the evolution of path loss to all radio terminals receiving said registration request of said step (c);
(e) said step (b) comprising adjusting said power level in accordance with path-loss variation and noise level from said step (d).

35. The method of transmitting radio calls in an ad-hoc peer-to-peer radio system comprising a series of radio terminals according to claim 34, further comprising:
(f) said radio terminal registering with at least one other said radio terminal, said at least one other radio terminal serving as a node of a connection routing path of a call for said radio terminal.

36. The method of transmitting radio calls in an ad-hoc, peer-to-peer radio system comprising a series of radio terminals according to claim 35, wherein said step (f) comprises:
(g) registering with a plurality of other said radio terminals for forming a multi-node connection routing path;
(h) each said other radio terminal forming a said node of said connection routing path storing information in said memory means thereof about said registration
(i) each said radio-terminal storing registration information in said memory means thereof about any other said radio terminal serving as a node therefor through which it has been registered; and
(j) each said radio-terminal also storing registration information in said memory means thereof about any other said radio terminal for which it serves as a node therefor through which said any other radio terminal has been registered.

37. The method of transmitting radio calls in an ad-hoc, peer-to-peer radio system according to claim 34, further comprising before said step (a):
(f) initiating an outgoing call from one said radio terminal;
(g) said step (f) comprising registering with another said radio terminal for serving as a node in the call connection by transmitting a registration request;
(h) said step (g) comprising initially transmitting said registration message on the last time slot (TS) of a respective said time frame (TF), said last time slot serving as said configuration channel.

38. The method of transmitting radio calls in an ad-hoc, peer-to-peer radio system according to claim 37, further comprising after said step (h):
(i) selecting in a time frame (TF), subsequent to said respective said time frame in which said registration messaging was sent by said step (h), a time slot (TS) earlier than said last time slot of said subsequent time frame as said configuration channel for transmitting configuration messaging.

39. The method of transmitting radio calls in an ad-hoc, peer-to-peer radio system comprising a series of radio terminals according to claim 34, further comprising:
(f) said step (c) comprising registering initially with one other said radio terminal for forming a node by which a call to and from said radio terminal may be completed;
(g) said one other radio terminal submitting said registration request signal from said radio terminal to at least one of another said radio terminal or a gateway;
(h) said one other radio terminal monitoring said control channel for information about the power level at which other said terminals are transmitting over said control channel; and
(i) adjusting the power level of said one other radio terminal based on the information received on said control channel in said step (a);
(j) said step (h) monitoring the evolution of path loss to all radio terminals receiving the registration request; and
(k) said step (i) comprising adjusting said power level in accordance with path-loss variation and noise level from said step (j).

40. The method of transmitting radio calls in an ad-hoc, peer-to-peer radio system comprising a series of radio terminals according to claim 39, further comprising:
(l) said step (g) comprising submitting the registration request directly to a gateway;
(m) recording in said gateway said registration request from said radio terminal;
(n) said step (m) comprising storing information about the connection path, consisting of at least one node, from said radio terminal to said gateway.

41. In a protocol for use in a network of terminals each having computer means, memory means for storing a program, and software means therein, said software means of each said terminal comprising means for generating communications-information for transmission based on time division messaging, said communications-information comprising a series of time frames (TF) each divided into a series of time slots (TS); said communications-information comprising at least one time slot in which control channel (CC) messaging information is transmitted, and other time slots in which is transmitted data-channel (DC) messaging information, the improvement comprising:
said at least one time slot transmitting said control-channel information at a first frequency of F0, and said other time slots (TS) transmitting said data-channel (DC) messaging information at different respective frequencies;
each said time frame (TF) comprising an inter-frame time gap (IFTG) at the end of each said time frame (TF) in which no communications-information is transmitted, whereby each said terminal is allowed time to perform necessary calculations.

42. The protocol according to claim 41, wherein said inter-frame time gap (ITFG) has a length different than said time slots.

43. The protocol according to claim 42, wherein each said time frame (TF) further comprises a last time slot (LTS); said software means further comprising means for generating initial control communications-information in a respective said last time slot (LTS) of a respective said time frame (TF) indicating initial presence of a respective said terminal in order to start communicating with other said terminals.

44. The protocol according to claim 43, wherein said software means further comprises means for switching transmission of initial control communications-information from said last time slot (TS) to another, free, earlier time slot of a subsequent time frame (TF) in order to reduce the chance of collision with other said terminals.

45. The protocol according to claim 44, wherein said initial control communications-information in said last time slot (TS) and in said another, free, earlier time slot of a subsequent time frame (TF) are transmitted at said first frequency.

46. The protocol according to claim 43, wherein said software means comprises means for encoding the communications-information in said last time slot (LTS) using code-division multiple access (CDMA), whereby collisions in said last time slot (LTS) are avoided.

47. The protocol according to claim 43, wherein said at least one time slot (TS) for said control-channel (CC) information is transmitted at a first power level, and said other time slots (TS) for said data-channel (DC) information are transmitted at a second power level.

48. The protocol according to claim 47, wherein said second power level is equal to or less than said first power level.

49. A radio terminal for an ad-hoc, peer-to-peer radio system comprising a series of radio terminals, each said radio terminal comprising transceiver means for transmitting and receiving signals from other like terminals of said series of terminals, computer means, memory means for storing program software means therein, and software means, said radio system based on time-dependent messaging having multiple parallel data channels and a control channel, the improvement comprising:
said software means comprising means for generating communications-information for transmission based on time-division messaging;
said communications-information comprising a series of time frames (TM) each divided into a series of time slots (TS); said communications-information comprising at least one time slot in which control-channel (CC) messaging information is transmitted, and other time slots in which is transmitted channel data (CD) messaging information;
said software means further comprising sending means for sending out message-signaling toward other said radio terminals for finding and registering with at least one other of said other radio terminals;
said sending means comprising transmitting status messaging over said control channel;
said software means also comprising listening means for listening to a response to said status messaging from at least another said radio terminal on said control channel;
said software means further comprising random means for randomly selecting at least another said time slot of at least one subsequent said time frame for said sending means to transmit said status messaging when said listening means receives no response;

said software means comprising power-incrementing means for increasing the power of transmission of said status messaging over a subsequent, selected, respective said time slot as compared with a previous said time slot in which said status messaging was transmitted.

50. The method according to claim 49, wherein said step (h) comprises continually increasing the power level for each subsequent time frame until a maximum level has been reached; and further comprising:

(i) identifying the radio terminal as being isolated and for causing the radio terminal to be a root of an isolated network (IN) if said step (f) does not receive a response from the transmitted status message after said step (h).

51. The radio terminal for an ad-hoc, peer-to-peer radio system according to claim 49, wherein said step (g) comprises sending out the status messaging at a random rate varying between a first, preselected minimum time and a maximum time N determined by three times the number of member-terminals in the isolated network (IN).

52. In a radio terminal for an ad-hoc, peer-to-peer radio system comprising a series of radio terminals, each said radio terminal comprising transceiver means for transmitting and receiving signals from other like terminals of said series of terminals, computer means, memory means for storing program software means therein, and software means, said radio system based on time-dependent messaging having multiple parallel data channels and a control channel, the method comprising:

(a) generating communications-information for transmission based on time-division messaging;

(b) said step (a) comprising generating a series of time frames (TM) each divided into a series of time slots (TS);

(c) said step (b) comprising dedicating at least one time slot for control-channel (CC) messaging information is transmitted, and other time slots in which is transmitted channel data (CD) messaging information;

(d) sending out message-signaling toward other said radio terminals for finding and registering with at least other radio terminal;

(e) said step (d) comprising transmitting status messaging over the control channel;

(f) listening to a response to said status messaging from at least another radio terminal on the control channel;

(g) randomly selecting at least another time slot of at least one subsequent time frame for retransmitting the status messaging when said step (f) did not hear a response from another terminal;

(h) incrementally increasing the power of transmission of the status messaging over a subsequent, selected, respective time slot as compared with a previous time slot in which said status messaging was transmitted, and repeating said step (e) using the new time slot in the new time frame.

53. The radio terminal for an ad-hoc, peer-to-peer radio system according to claim 52, said power-incrementing means continually increases the power level for each subsequent said time frame until a maximum level has been reached;

said software means further comprising means for identifying said radio terminal as being isolated and for setting said radio terminal as a root of an isolated network (IN) if said listening means does not receive a response from said status message after said power-incrementing means has sent out over a time slot at said maximum power level.

54. The radio terminal for an ad-hoc, peer-to-peer radio system according to claim 53, wherein said random means sends out said status messaging from said sending means at a random rate varying between a first, preselected minimum time and a maximum time N determined by three times the number of member-terminals in said isolated network (IN).

55. In an ad-hoc, peer-to-peer radio system comprising a series of radio terminals, each said radio terminal comprising transceiver means for transmitting and receiving signals from other like terminals of said series of terminals, computer means, and memory means for storing program software means therein, said radio system based on time-dependent messaging having multiple parallel data channels and a control channel, the method comprising:

(a) generating communications-information for transmission based on time-division messaging;

(b) said step (a) comprising generating a series of time frames (TM) each divided into a series of time slots (TS);

(c) said step (b) comprising dedicating at least one time slot for control-channel (CC) messaging information is transmitted, and other time slots in which is transmitted channel data (CD) messaging information;

(d) when said transceiver is idle from transmitting or receiving messaging information in said step (a), sending out maintenance message-signaling toward other said radio terminals for maintaining a link with at least one other said radio terminal;

(e) said step (d) comprising transmitting said maintenance status messaging message-signaling over the control channel.

56. In an ad-hoc, peer-to-peer radio system comprising a series of radio terminals, each said radio terminal comprising transceiver means for transmitting and receiving signals from other like terminals of said series of terminals, computer means, and memory means for storing program software means therein, said radio system based on time-dependent messaging having multiple parallel data channels and a control channel, the method comprising:

(a) building a link between a source terminal and a destination radio terminal or gateway;

(b) said step (b) comprising sending out link message-signaling from said source terminal toward said destination over said control channel at a first power level;

(c) after said step (b), said source terminal listening to said control channel for a response to said step (b) by any other said radio terminal;

(d) if said step (c) indicated no response, increasing said power level;

(e) if said step (c) indicated a response, said destination adjusting its power of transmission in accordance with the length of the path from said source to said destination and the type of service;

(f) sending out a dummy Clear-to-Send (CTS) from said destination at the power set in said step (e);

(g) a terminal receiving said dummy CTS of said step (f), and which was part of said link to said destination, answering said destination with a Ready-to-Link (RTL) message; and (h) selecting the first hop of the link for which a connecting routing path is to be formed.

* * * * *